(12) United States Patent
Ono et al.

(10) Patent No.: US 7,836,507 B2
(45) Date of Patent: Nov. 16, 2010

(54) CONTENTS TRANSMITTER APPARATUS, CONTENTS RECEIVER APPARATUS AND CONTENTS TRANSMITTING METHOD

(75) Inventors: Chiyo Ono, Fujisawa (JP); Hiroo Okamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 876 days.

(21) Appl. No.: 10/846,922

(22) Filed: May 17, 2004

(65) Prior Publication Data

US 2005/0210290 A1    Sep. 22, 2005

(30) Foreign Application Priority Data

Mar. 19, 2004  (JP)  ............... 2004-079451

(51) Int. Cl.
*G06F 7/04*  (2006.01)
*G06F 17/30*  (2006.01)
*H04N 7/16*  (2006.01)
*H04N 7/173*  (2006.01)
*H04L 9/32*  (2006.01)
*H04L 9/00*  (2006.01)
*B41K 3/38*  (2006.01)

(52) U.S. Cl. .................. 726/26; 726/2; 713/168; 380/59; 380/277; 725/25; 725/100; 725/109; 725/131; 725/135; 725/151

(58) Field of Classification Search .......... 726/2, 726/3, 5, 6, 7
See application file for complete search history.

(56) References Cited

U.S. PATENT DOCUMENTS 5,319,705 A * 6/1994 Halter et al. ............... 705/54

(Continued)

FOREIGN PATENT DOCUMENTS

CN   1392706 A   1/2003

(Continued)

OTHER PUBLICATIONS

Hitachi et al., "5C Digital Transmission Content Protection White Paper," Jul. 14, 1998, Revision 1.0.

(Continued)

*Primary Examiner*—Nasser Moazzami
*Assistant Examiner*—Oscar A Louie
(74) *Attorney, Agent, or Firm*—McDermott Will & Emery LLP

(57) ABSTRACT

For achieving the protection of copyright, by suppressing illegal copy production thereof, in particular, when transmitting contents with using a wired or wireless LAN, as well as, for preventing the transmission of contents from deviating from a range of a personal use thereof, a contents transmitter apparatus and a contents receiver apparatus make an authentication, mutually, before transmitting contents therebetween. At the time when conducting this authentication, measurement is made upon a time-period up to arrival of a receipt confirmation responding to the transmission of an authentication request or a response to the authentication; then, only in the case when this value measured does not exceed a predetermined upper value, the transmission is conducted on the contents encrypted, and at the same time, address information and equipment information unique to the apparatus are registered, thereby conducting the transmission of encrypted contents, but without conducting the time-measurement thereon, when transmitting the contents, again. Also, while conducting the time-measurement periodically, dynamic management is made on the registration information, so that the contents thereof are suitable for the network structure at the present.

10 Claims, 13 Drawing Sheets

U.S. PATENT DOCUMENTS

| | | | |
|---|---|---|---|
| 5,715,403 A * | 2/1998 | Stefik | 705/44 |
| 6,058,476 A | 5/2000 | Matsuzaki et al. | |
| 6,282,653 B1 * | 8/2001 | Berstis et al. | 726/26 |
| 6,515,575 B1 * | 2/2003 | Kataoka | 340/5.8 |
| 6,538,558 B2 | 3/2003 | Sakazume et al. | |
| 6,574,611 B1 * | 6/2003 | Matsuyama et al. | 705/57 |
| 6,782,260 B2 * | 8/2004 | Nakakita et al. | 455/435.1 |
| 7,058,414 B1 * | 6/2006 | Rofheart et al. | 455/456.4 |
| 7,287,282 B2 | 10/2007 | Yamada et al. | |
| 7,296,147 B2 | 11/2007 | Matsuzaki et al. | |
| 7,324,644 B2 | 1/2008 | Saito | |
| 7,370,112 B2 | 5/2008 | Saito et al. | |
| 2003/0046541 A1 | 3/2003 | Gerdes et al. | |
| 2003/0061165 A1 | 3/2003 | Okamoto et al. | |
| 2003/0226011 A1 | 12/2003 | Kuwano et al. | |
| 2004/0076294 A1 | 4/2004 | Shibata et al. | |
| 2004/0083364 A1 * | 4/2004 | Andreaux et al. | 713/165 |
| 2004/0098583 A1 * | 5/2004 | Weber | 713/168 |
| 2004/0193881 A1 | 9/2004 | Ayaki et al. | |
| 2004/0203600 A1 * | 10/2004 | McCorkle et al. | 455/411 |
| 2004/0268131 A1 | 12/2004 | Kudo et al. | |
| 2005/0027984 A1 | 2/2005 | Saito et al. | |
| 2005/0114647 A1 | 5/2005 | Epstein | |
| 2005/0160265 A1 | 7/2005 | Tanaka et al. | |
| 2005/0160274 A1 | 7/2005 | Yukimatsu et al. | |
| 2006/0265735 A1 | 11/2006 | Ohno | |

FOREIGN PATENT DOCUMENTS

| | | |
|---|---|---|
| JP | 10-271154 | 10/1998 |
| JP | 2000-287192 | 10/2000 |
| JP | 2001-285284 | 10/2001 |
| JP | 2001-358706 | 12/2001 |
| JP | 2002-229950 A | 8/2002 |
| JP | 2002-300162 | 10/2002 |
| JP | 2004-072721 | 3/2004 |
| JP | 2005-204094 | 7/2005 |
| KR | 10-2001-0004137 | 1/2001 |
| KR | 2002-0019575 | 3/2002 |
| KR | 10-2002-0063659 | 8/2002 |
| KR | 2004-10-0034226 | 1/2004 |
| WO | WO 99/55042 | 10/1999 |
| WO | WO 01/93434 A2 | 12/2001 |
| WO | WO 01/93580 A2 | 12/2001 |
| WO | WO 2004014037 A1 * | 2/2004 |

OTHER PUBLICATIONS

Bie Zujie "Network Speed Testing" pp. 69-70 PC Computing Aug. 2000 China Academic Journal Electronic Publishing House (Japanese with the English Translation).

Comer D.E., Computer Networks and Internets With Internet Applications, Third Edition, Chapter 24, "TCP: Reliable Transport Service", Prentice Hall International, Inc., 2001.

United States Office Action issued in U.S. Appl. No. 10/846,594 dated Aug. 3, 2009.

Menezes et al., *Handbook of Applied Cryptology*, CRC Press, 1997, pp. 397-405.

Japanese Office Action issued in Japanese Patent Application No. 2004-008621, mailed Dec. 15, 2009.

Japanese Office Action issued in Japanese Patent Application No. 2004-079451, mailed Dec. 15, 2009.

Digital Transmission Content Protection Specification vol. 1 (Informational Version), Jul. 25, 2000.

United States Office Action issued in U.S. Appl. No. 10/846,594 dated Jun. 9, 2010.

* cited by examiner

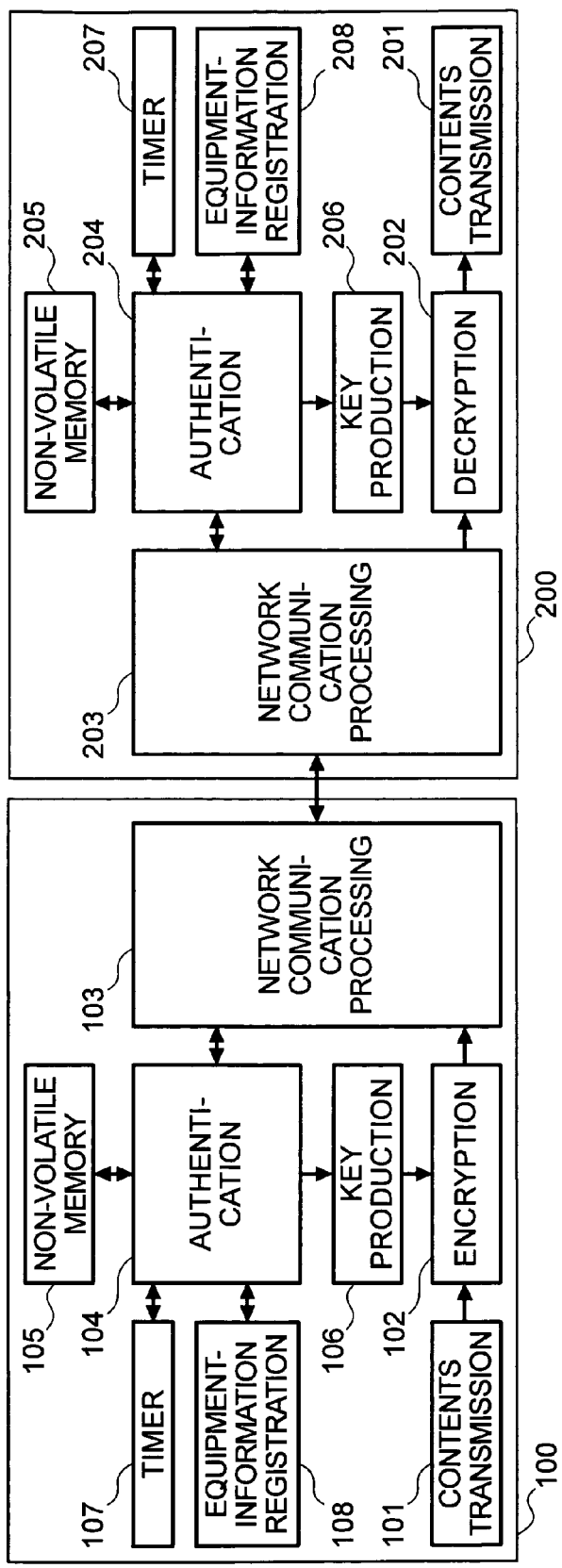
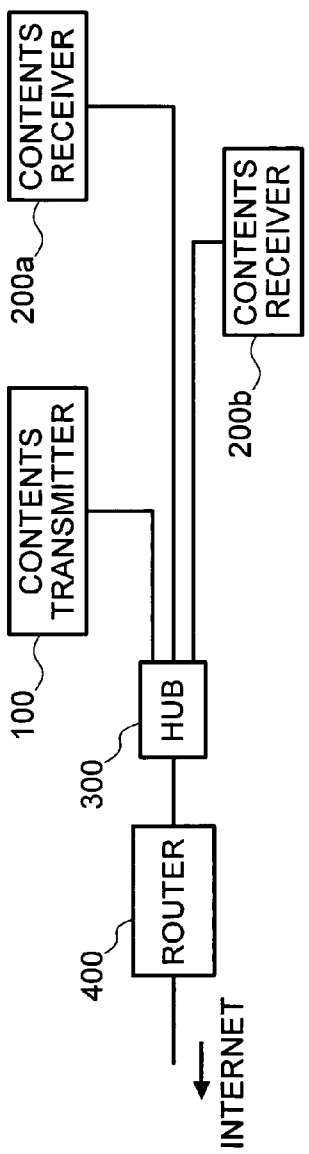
FIG.1
FIG.2

| ADDRESS INFORMATION | | APPARATUS UNIQUE INFORMATION |
|---|---|---|
| IP | MAC | PUBLICATION KEY |
| aaa.aaa.aaa.aaa | aa:bb:cc:dd:ee:ff | abcdefg······ |
| bbb.bbb.bbb.bbb | bb:cc:dd:ee:ff:aa | bcdefgh······ |

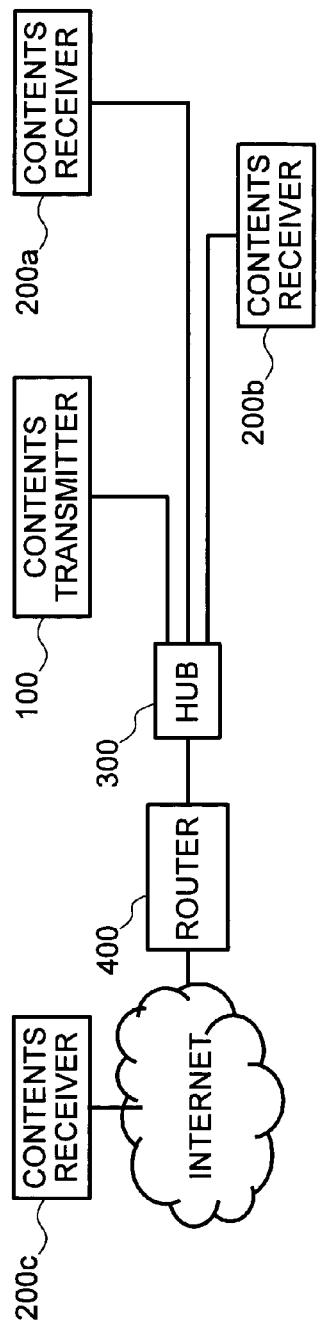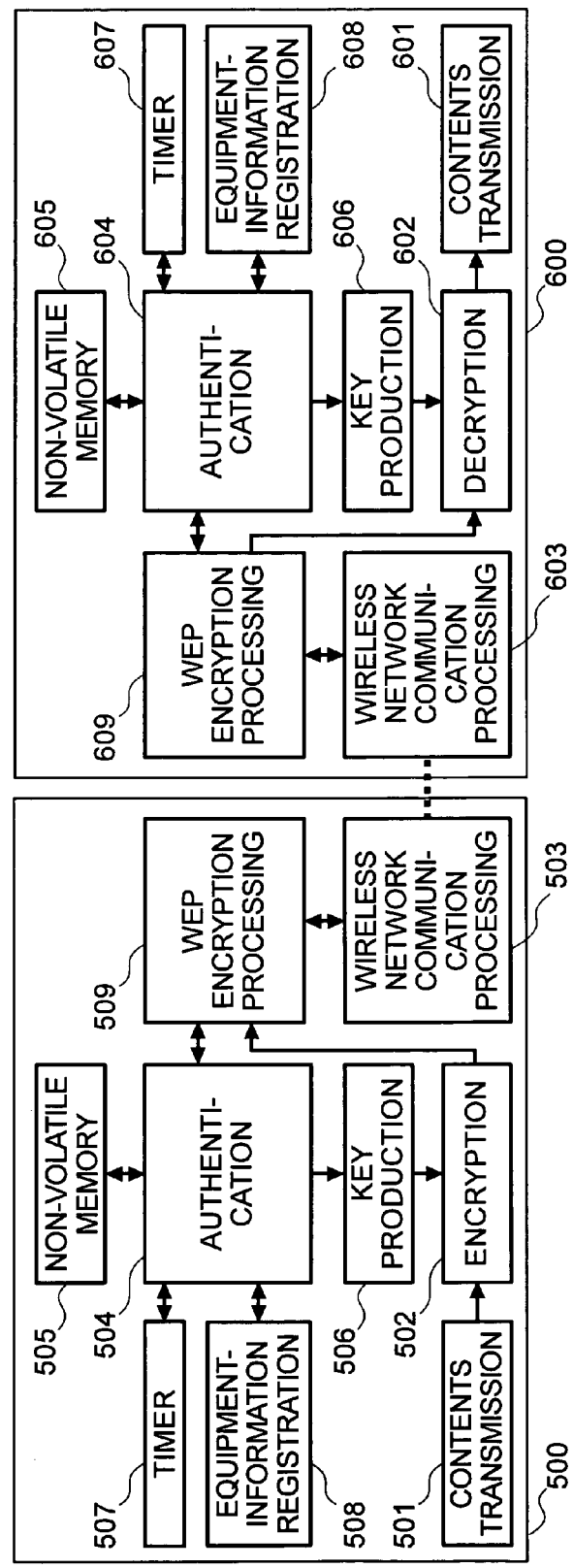

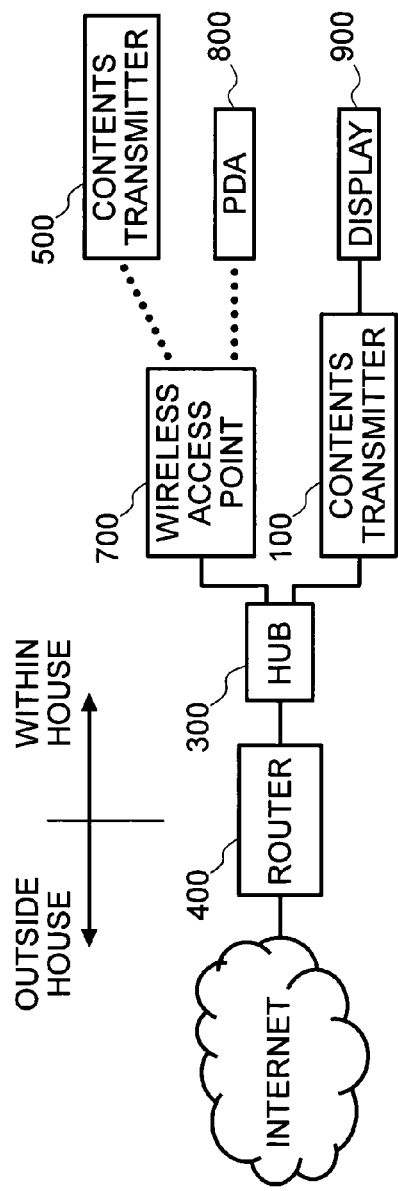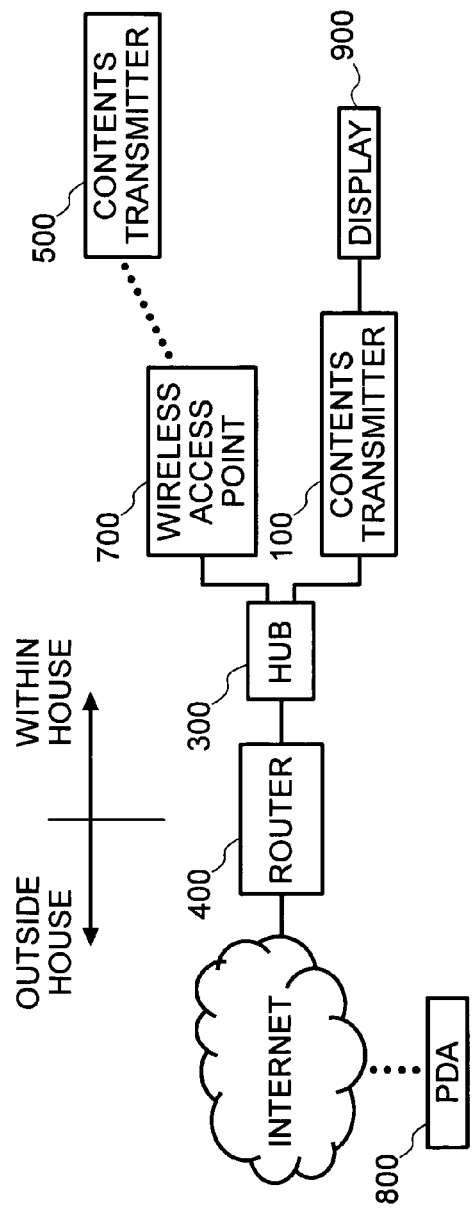

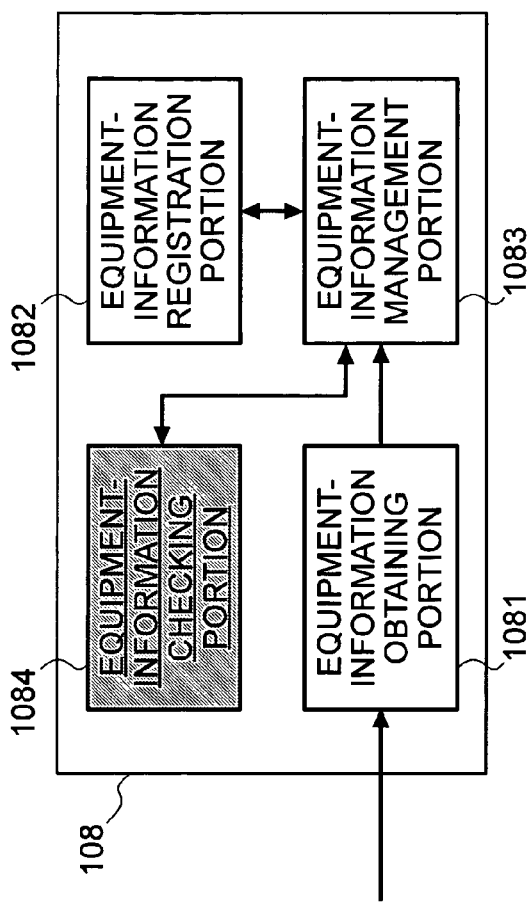

CONTENTS TRANSMITTER APPARATUS, CONTENTS RECEIVER APPARATUS AND CONTENTS TRANSMITTING METHOD

BACKGROUND OF THE INVENTION

The present invention relates to a transmitter apparatus and a receiver apparatus, being suitable for protecting the copyright of contents transmitted, such as, audio/video information, for example, in particular, when transmitting the contents through a network.

Accompanying developments made on a personal computer (hereinafter, being called by "PC"), in particular, on the processing capacity; such as, the calculation speed and/or the memory capacity thereof, a tendency is also advancing into bringing a hard disk drive (hereinafter, being called by "HDD"), which is built-in within the PC, to be large in the capacity thereof. Under such the situation as was mentioned above, in recent years, it comes to be possible to make it in such away of using; i.e., viewing the picture of TV broadcasting program recoded on a display of the PC, while recording it with using the HDD, on the PC of such a rank that is widely used at home. On the other hand, with the tendency of a low price of the HDD having a large capacity, a HDD recording apparatus appears on the market, building the HDD therein and digitally recoding video/audio information therein, to be a household recording apparatus, for example, and it attracts an attention for a good usability thereof, due to the fact that a disk is used as a medium for recoding the picture thereon.

On the other hand, for the purpose of achieving the copyright protection on the information, such as the contents, etc., there is already known a method of copy protection, which is already applied in digital AV equipments, such as, Digital Transmission Content Protection (DTCP) method (described in "5C Digital Transmission Content Protection White Paper, by Hitachi, Ltd., Non-Patent Publication 1), as an example thereof, determining a copy protection method on the IEEE1394 bus, for example.

Also, there are already disclosed a several number of technologies, for achieving the copy protection for the purpose of copyright protection between the apparatuses or between networks; such as, Patent Document 1 (Japanese Patent Laying-Open No. 2000-287192 (2000)) and Patent Document 2 (Japanese Patent Laying-Open No. 2001-358706 (2001)), for example.

BRIEF SUMMARY OF THE INVENTION

With such the recording apparatus and/or the PC applying the HDD therein, as was mentioned above, since the video/audio information is recorder on the HDD fixed within the apparatus, then the apparatus itself must be carried when viewing the program recorded in other rooms within a house; therefore, it is difficult to achieve a portability of the video/audio information by a level of a recording medium; such as, using a removable or exchangeable medium to be exchanged while providing the recording/reproducing apparatuses, such as, the VTR, etc., in a plural number thereof.

Then, it can be considered to transmit the contents to other PC or a receiver apparatus through a network, while installing an interface for wired or wireless LAN (Local Area Network), thereby enabling the viewing of the video/audio information recorded in any place or room within the same house.

Conventionally, in a case where the contents is transmitted to another PC or a receiver apparatus through the network, while installing an interface for the wired or wireless LAN (Local Area Network), thereby enabling to view the video/audio information recorded in anywhere within the house, however no consideration was paid upon the copyright protection of the video/audio information (hereinafter, explanation will be made it to be "contents"), to be protected the copyright thereof; then, the video/audio information recorded on the HDD can be further reserved on a HDD in other PC, receiving it through the LAN, and therefore the video/audio information which can be treated by that apparatus must be the contents of so-called "Copy fee", being able to make a copy thereof, freely.

In general, when transmitting the contents digitally recorded through the network, etc., from a certain apparatus to other apparatus, to be recorded therein, since a copy (a duplicate) can be produced at a receiver side, being same in the quality to that contents located at the transmitter side, due to the fact that deterioration or degradation is less in the data quality during the time-period of transmission thereof, therefore there is a necessity of paying a consideration into, in particular, for the video and audio data (hereinafter, being called by "contents") to be protected the copyright thereof, so that it can be protected from being produced an illegal copy thereof, deviating from a range of a personal use thereof. For example, when transmitting the contents between the digital AV equipments, coding or encryption is made on the contents at the transmitter side thereof, while the information for decoding or decryption is held between the transmitter side and the receiver side of contents, so that the contents cannot be correctly or legally copied by an apparatus other than the contents receiver apparatus, at an end of the transmission, thereby achieving the copy protection thereon from being copied endlessly.

As an example of such the method of copy protection, in particular, being applied into the digital AV equipment, there is already known a DTCP method described in the Non-Patent Document 1, for example. Under the DTCP method, while classifying the contents into "Copy free", "Copy one generation", "No more copies" and "Copy never", to be managed with, the recording apparatus can records only the contents of the "Copy free" and the "Copy one generation"; however, it treats the contents of the "Copy one generation" to be that of "No more copies", while treating the encryption process upon the contents on the bus, excepting for that of the "Copy free", at the transmitter side, thereby bringing it unattainable of copying the contents endlessly.

On the transmission of contents with using the wired or wireless LAN, there are disclosed a several technologies for achieving the copy protection for the purpose of copyright protection, in the way of thinking similar to that of the DTCP method. For example, the Patent Document 1 mentioned above discloses therein a technology, for applying a method similar to the DTCP into the method of the copy protection for user in the communication of digital contents on the network, and also the Patent Document 2 discloses a technology for making up the structure between the apparatuses, which communicate the contents encrypted for achieving the copyright protection, in the similar manner.

And, when transmitting the contents through the wired or wireless LAN, it is not taken into the consideration thereof, that the transmitter side and the receiver side are locating within the same house or not. Rather, in a case when conducting a downloading from a distributor server, for example, it is common that the transmitter side is located within a side of the provider, while the receiver side within a house, in general.

Accordingly, even if applying the technology mentioned above into a case when trying to record the contents by means of the HDD of the PC, or the recording apparatus building the HDD therein, thereby trying to transmit it from here to the other apparatus locating outside the house; then, it is possible to receive the contents to be displayed, for the other receiver apparatus, which is locating within the other house and is connected therewith through an Internet, if the LAN in that house is connected to the Internet, for example, however the contents can be also spread further to anywhere all over the world, in the region thereof, in particular, if it is connected to the Internet.

Under such the situation, even trying to achieve the copy protection with an aid of such the technology mentioned above, for example, however if the user of the recording apparatus brings the recording apparatus to be accessible from the Internet, it is possible to receive and display the contents, freely, with an aid of any other receiver apparatus having such the copy protection; therefore, it deviates from a region of the personal use, to be an inherent object for the copyright protection.

According to the present invention, an object is to provide a transmitter apparatus and a receiver apparatus for contents or information, and also a contents transmitting method, enabling an implementation of the copy protection for preventing from the illegal copying or duplication of the contents, when transmitting the contents by using such the wired or wireless LAN provided within a house, and further, enabling to make a restriction upon the legal viewing of the contents and/or production of the copy or duplicate thereof, within a region of the personal use.

For dissolving the problems mentioned above, according to the present invention, there is provided a contents transmitter apparatus for conducting transmission of contents through a network, comprising: a network communication processing means for conducting transmission of data through a network; a transmission contents producing means for supplying contents, to be transmitted to a contents receiver apparatus, which is connected thereto through said network, to said network communication processing means; an authentication means for receiving an authentication request from said contents receiver apparatus, so as to make determination upon an authentication to said authentication request, and also for issuing an authentication request of itself to said contents receiver apparatus; an encryption means for producing key information upon basis of information, which is obtained through execution of an authentication processing in said authentication means, and for conducting encryption processing on the contents to be transmitted to said contents receiver apparatus with an aid of said key information; a timer means (or a time measuring means) for transmitting an authentication request or a time authentication request to said contents receiver apparatus, and for measuring a time-period up to when receiving a response to said request, or for measuring a time up to arrival of a receipt confirmation from said contents receiving apparatus responding to transmission of a response to the authentication request from said contents receiving apparatus, depending upon the necessity thereof; and an equipment-information management means for registering and managing equipment information about said contents receiver apparatus, wherein said equipment-information management means controls the registration of an address information of said contents receiver apparatus and an equipment information unique to the apparatus, which are memorized in advance when manufacturing the apparatus.

Also, according to the present invention, in said timer means, the address information and the equipment information unique to the apparatus of said contents receiver apparatus into said equipment-information management means, if a result of the measurement made by said timer means does not exceed a predetermined value.

Also, according to the present invention, when receiving a contents receipt request from said contents receiver apparatus, transmission of the contents is conducted to said contents receiver apparatus without conducting time measurement by means of said timer means, when comparing the address information and the equipment information unique to the apparatus, which are registered within said equipment-information management means, and the address information and the equipment information unique to the apparatus of said contents receiver apparatus, and if they coincide with.

Also, for the purpose of managing the registration information relating to the contents receiver apparatus, appropriately, the measurement on the time is made by said timer means, periodically or at an arbitrary timing, with respect to said contents receiver apparatus, which is registered of said information thereof, thereby renewing said registration information depending upon a result of said measurement.

Further, according to the present invention, for dissolving the problems mentioned above, there is provided a contents receiver apparatus for receiving contents through a network, comprising: a network communication processing means for conducting transmission of data through a network; a contents receiving and processing means for receiving contents received from a contents transmitter apparatus, which is connected through said network, from said network communication processing means; an authentication means for issuing an authentication request to be transmitted to said contents transmitter apparatus, and for conducting determination upon authentication with respect to an authentication request from said contents transmitter apparatus; a decryption means for producing key information upon basis of information, which is obtained through execution of an authentication process within said authentication means, and for executing decryption process of the contents received from said contents transmitter apparatus with an aid of said key information; a timer means for measuring a time up to arrival of a receipt confirmation from said contents transmitter apparatus, responding to the transmission of the authentication request to said contents transmitter apparatus or the transmission of a response to the authentication request from said contents transmitter apparatus, or a means for making a request of transmitting the time authentication request to said contents transmitter apparatus, and for responding to the time authentication request transmitted from said contents transmitter apparatus; and an equipment-information management means for registering and managing the equipment information of said contents transmitter apparatus, wherein said equipment-information management means makes control upon the registration of the address information of said contents transmitter apparatus and the equipment information unique to the apparatus, which is memorized in advance when manufacturing the apparatus, depending upon a result of the measurement in said timer means.

Also, for the purpose of managing the registration information relating to the contents transmitter apparatus, appropriately, the measurement on the time is made by said timer means, periodically or at an arbitrary timing, with respect to said contents transmitter apparatus, which is registered of said information thereof, thereby renewing said registration information depending upon a result of said measurement.

Also, a response is made to the time authentication request transmitted from said contents transmitter apparatus, and measurement is made on a time up to said response within said contents transmitter apparatus, wherein the address information and the equipment information unique to the apparatus of itself are registered within said contents transmitter apparatus if said result of measurement does not exceed a predetermined value.

And, also, a response is made responding to a time authentication request transmitted from said contents transmitter apparatus, and measurement is conducted on a time up to said response within said contents transmitter apparatus, thereby making a request to said contents transmitter apparatus, depending upon necessity thereof, of transmitting said time authentication request from said contents transmitter apparatus.

Namely, according to the present invention, the contents transmitter apparatus and the contents receiver apparatus make an authentication, mutually, before making transmission of the contents therebetween, and at the time when conducting this authentication, the measurement is made on the time-period up to the arrival of the receipt confirmation in response to the transmission of the authentication request, or of the response to the authentication; then, only in the case when this measured value does not exceed a predetermined upper value, the transmission is conducted on the contents, which is encrypted with using a common key data, and at the same time, the address information and the equipment information unique to the apparatus are registered, thereby enabling the transmission of encrypted contents without conducting the time-measurement mentioned above thereon, when transmitting the contents, again. Also, reconsideration is made on the contents of the address information and the equipment information unique to the apparatus, periodically or at an arbitrary timing, thereby avoiding the apparatus, which is not connected to the network or is low in the frequency of use, from keeping the condition of being registered therein.

With this, it is possible to execute the copy protection upon the contents for preventing them from an illegal copying thereof, in particular, when the contents is transmitted with using a wired or wireless LAN provided within a house, and further possible to restrict the viewing and the copy production of the contents within a region of personal use.

Thus, according to the present invention, it is possible to improve reliability of the contents transmitter apparatus and the contents receiver apparatus, and also of transmission of the contents, using the wired or wireless LAN provided within a house.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 1 is a view for showing the structure of a contents transmitter apparatus and a contents receiver apparatus with using a wired LAN therein, according to the present invention;

FIG. 2 a block diagram for showing a wired LAN system, which is made up with the contents transmitter apparatus and the contents receiver apparatus, according to the present invention;

FIG. 7 is a view for showing the structure when transmitting the contents through the Internet between the contents transmitter apparatus and the contents receiver apparatus, according to the present invention;

FIG. 8 is a view for showing the structure of the contents transmitter apparatus and the contents receiver apparatus, but using a wireless LAN therein, according to the present invention;

FIGS. 10(a) and 10(b) are views for showing the structure of using a PDA therein, according to the present invention;

FIG. 11 is one example for showing the detailed view of the equipment information registration circuit of the contents transmitter apparatus, according to the present invention;

FIG. 12 is a view for showing one example of lists, which are registered within the equipment information registration circuit of the contents transmitter apparatus, according to the present invention;

DETAILED DESCRIPTION OF THE INVENTION

Figures 3, 4:
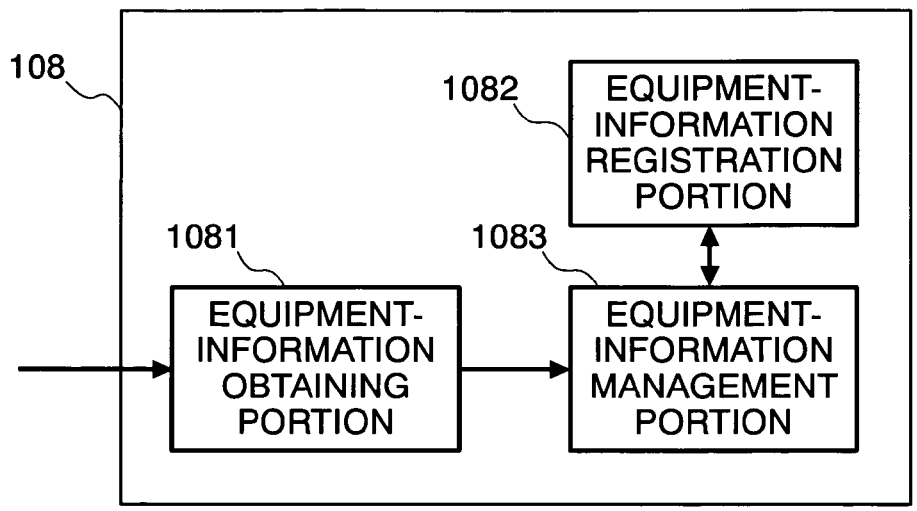
FIG. 3 is a detailed view for showing an equipment information registration circuit of the contents transmitter apparatus, according to the present invention.
FIG. 4 is a view for showing a list, which is registered within the equipment information registration circuit of the contents transmitter apparatus, according to the present invention.

Hereinafter, embodiments according to the present invention will be fully explained, by referring to the attached drawings.

Embodiment 1

Hereinafter, explanation will be given on the embodiment 1, according to the present invention.

FIG. 1 is a view for showing the structures of the contents transmitter apparatus 100 and the contents receiver apparatus 200, according to one embodiment of the present invention, wherein the contents transmitter apparatus 100 and the contents receiver apparatus 200 are connected with each other through a LAN. In the contents transmitter apparatus 100, a reference numeral 101 depicts a contents transmitter circuit for sending out the contents to the contents receiver apparatus

200, 102 an encryption circuit for encoding or encrypting the contents, which is outputted by the contents transmitter apparatus 100, 103 a network communication processing circuit for communicating an output of the encryption circuit 102 and an input/output of an authentication circuit 104 with other apparatus(e) through the LAN, 104 the authentication circuit, for conducting a mutual authentication between apparatuses through conducting information between the other apparatus(es), being connected onto the LAN, 105 a non-volatile memory for storing information necessary for the processing conducted within the authentication circuit 104, 106 a key producing circuit for producing a key information necessary for encrypting the contents within the encryption circuit 102, 107 a timer circuit for measuring a time-period, starting from the time when transmitting the information to the other apparatus(es), such as, the authentication request, which is generated by the authentication circuit 104, for example, up to the time when a receipt confirmation arrives at responding to that information, and 108 is an equipment information registration circuit for registering the equipment information about the other apparatus(es), which is/are authenticated in the authentication circuit 104, thereby managing them therein; wherein the contents provided from the contents transmitter apparatus 101 is attached with a discrimination code indicative of a manner of handling or treatment thereof; such as, "Copy free", "Copy one generation", "No more copies" or "Copy never", and then, it is transmitted to the contents receiver apparatus.

In the contents receiver apparatus 200, a reference numeral 201 depicts a contents receiving circuit for receiving the contents transmitted through the LAN, 202 a decryption circuit for receiving the contents encrypted within the encryption circuit 102 of the contents transmitting circuit 102 from the network communication processing circuit 203, for decryption thereof, so as to provide it to the contents receiving circuit 201, 203 a network communication processing circuit, for communicating an input to the decryption circuit 202 and an input/output of the authentication circuit 204 between the other apparatus (es) through the network, 204 the authentication circuit for achieving a mutual authentication between the apparatuses, through communication of information between the other apparatus(es), 205 a non-volatile memory for storing therein the information necessary for processing within the authentication circuit 204, 206 a key producing circuit for producing a key necessary for decryption of the information within the authentication circuit 202, upon the basis of the information outputted by the authentication circuit 204, 207 a timer circuit for measuring a time-period, starting from the time when transmitting the information, such as, the authentication request, for example, from the authentication circuit 204 to the other apparatus, up to the time when a receipt confirmation arrives at responding to that information, 208 an equipment information registration circuit for registering the equipment information of the other apparatus(es), which are authenticated in the authentication circuit 204, thereby managing it; wherein the contents received is processed in accordance with the discrimination code, which is transmitted together with the contents; such as, "Copy free", "Copy one generation", "No more copies" or "Copy never", for example. Thus, the contents of "Copy free" or "Copy one generation" can be recorded in a recording medium, while the contents of "Copy one generation", when being recorded, thereafter it is treated to be that of "No more copies".

FIG. 2 shows an example of the structure of the LAN provided in a house, including therein the contents transmitter apparatus 100 and the contents receiver apparatus 200. One (1) set of the contents transmitter apparatus 100 and two (2) sets of the contents receiver apparatus 200*a* and 200*b* are connected to a network hub device 300, through cables of the wired LAN, respectively, while the network hub device 300 is connected to a router 400. The router 400 is connected with the Internet through; such as, a modem, a photoelectric conversion element, etc., for example. With the contents transmitter apparatus 100, the contents receiver apparatuses 200*a* and 200*b*, and the router 400, each of them has it's own IP address, respectively, for identifying itself on the LAN. Also, within an interface portion of the each network communication processing circuit, there was already given or memorized a MAC (Media Access Control) address of 48 bits, when it is manufactured. Setting up of the IP address to each of the apparatuses or devices may be made; for example, by assigning the IP address to each of the apparatuses from the router 400, operating it as a DHCP server, according to the DHCP (Dynamic Host Configuration Protocol), being widely adopted for an automatic setup of addresses in the network, conventionally. However, in case of using an IPv6 (Internet Protocol Version 6), it is possible for each of the apparatuses to determine it's own IP address of itself, from upper 64 bits of the IP address within the router 400 and the MAC address, according to the method, which is called by a stateless automatic setting.

FIG. 3 is a view for showing the structure of the equipment information registration means 108, which is held by the contents transmitter apparatus 100. As an example, explanation will be given on an example of the method, for registering the address information and also the equipment information being unique to the apparatus about the contents receiver apparatus, in particular, in a case where the contents receiver apparatus 200 is connected to the network, to which the contents transmitter apparatus is connected. A reference numeral 1081 indicates an equipment-information obtaining portion for obtaining the address information and the equipment information unique to the apparatus from the contents receiver apparatus 200, 1082 an equipment-information registration portion for registering therein the address information and the equipment information unique to the apparatus of the contents receiver apparatus, which are obtained in the said equipment-information obtaining portion 1081, and 1083 an equipment-information management portion for registering the contents receiver apparatus 200 and also for authenticating the contents receiver apparatus 200 from the equipment information registered within the equipment-information registration portion 1082. In the equipment-information obtaining portion 1081, for example, an application for use of registering the equipment information, or a Web page for use of the registration, using a browser therein, is transmitted to the contents receiver apparatus 200. Upon receipt of the said application for use of registering the equipment information or the Web page for use of the registration, the contents receiver apparatus 200 registers the address information of itself and the equipment information unique to the apparatus into the contents transmitter apparatus 100, automatically, or through inputting a registration item which is made by a user, in accordance with the application for use of registration of the equipment information or the contents instructed on the Web page. Herein, the equipment information unique to the apparatus may be, such as, a publication key, which is produced by a specific authenticating organization and reserved within the non-volatile memory 205 of the contents receiver apparatus, for example. Since the said publication key is one, which was memorized into the non-volatile memory 205 in advance, for example, when the contents receiver apparatus 200 is manufactured; therefore, it is possible to own a unique value for each of those apparatuses. FIG. 4 shows an example of the equipment information, which is registered within the equipment-information registration portion 1082. Thus, the IP address and the MAC address are registered as the address information of the contents receiver apparatus 200, while the publication key as the information unique to the apparatus, which is reserved within the non-volatile memory 205 of the contents receiver apparatus 200.

From those mentioned above, for the contents transmitter apparatus 100, it is possible to specify the contents receiver apparatus 200 that is registered, upon the basis of the equipment information registered within the equipment-information registration portion 108 mentioned above, when authenticating the contents receiver apparatus 200.

Herein, the explanation was given in the above, only about the case where the publication key is used, to be the information unique to the apparatus, when making authentication mutually, in particular, when applying the DTCP therein; wherein, a copy protection method is established upon the transmission of contents between the contents transmitter apparatus and the contents receiver apparatus, which are connected with each other through the network. However, the information unique to the apparatus should not be limited only to that publication key, in particular, but it is also possible to register other information being unique, as far as it is possible to identify the apparatus.

Also, though the description was made in the above, only upon the method, wherein the contents transmitter apparatus 100 registers the equipment information of the contents receiver apparatus 200, however it is also true for the method, wherein the contents receiver apparatus 200 registers that of the contents transmitter apparatus.

Embodiment 2

Next, explanation will be given below, about an embodiment 2, according to the present invention.

According to the feature of the present embodiment, it is possible to provide a contents transmitter apparatus and a contents receiver apparatus, wherein a copy protection can be executed for protecting the contents from illegally producing a copy thereof, and further a use of contents can be limited within a region of the personal use thereof; such as, viewing and/or producing a copy can be made legally, on the contents, in particular, when transmitting the contents with using the wired or wireless LAN.

Figure 5:
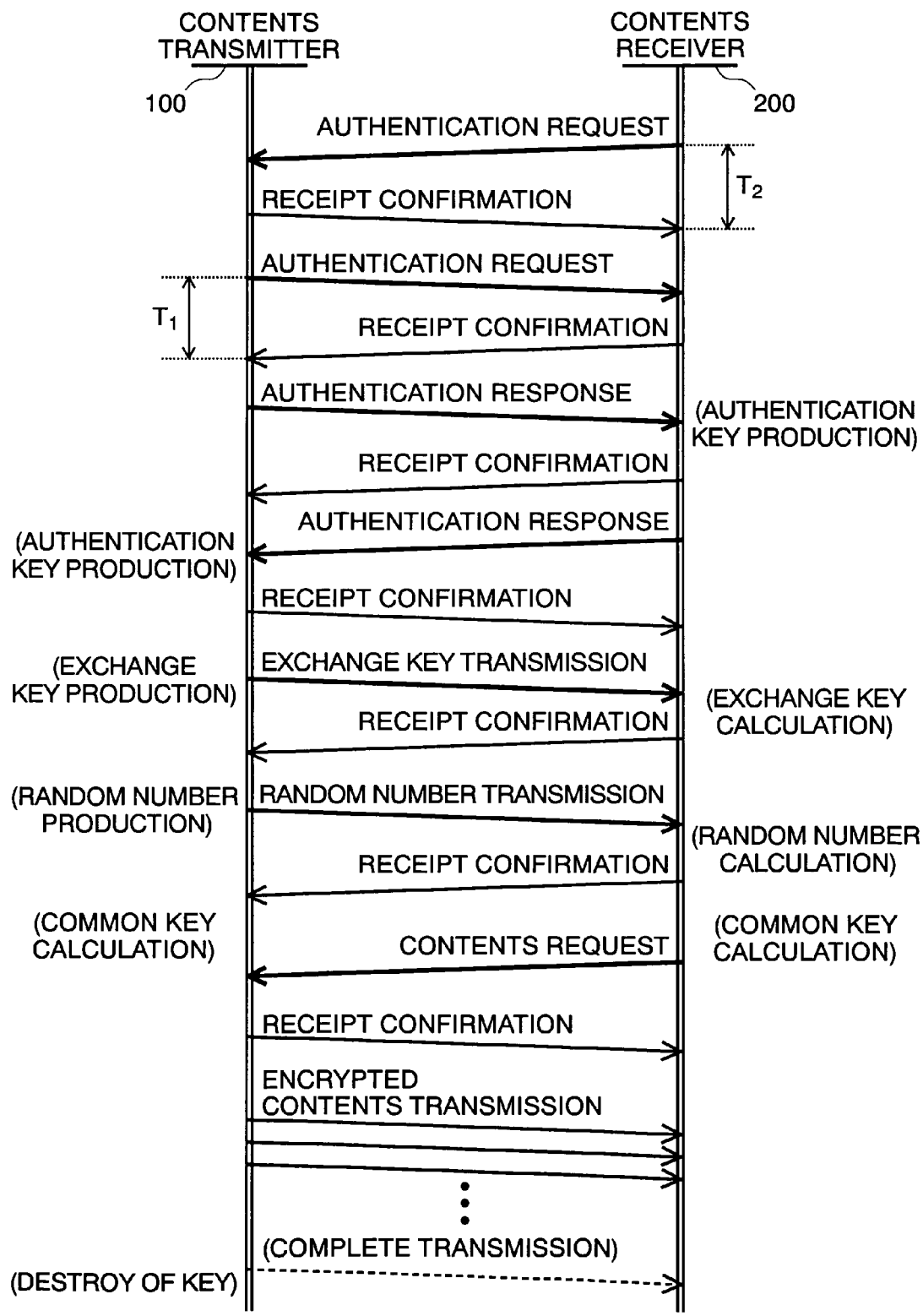
FIG. 5 is a view for showing a process of transmitting contents between the contents receiver apparatuses, according to the present invention.

FIG. 5 shows an example of processes when transmitting/receiving the contents between the contents transmitter apparatus 100 and the contents receiver apparatus 200. In this figure, the left-hand side indicates the contents transmitter apparatus 100, while the right-hand side the contents receiver apparatus 200, and arrows therein indicate the timings and the directions of those transmissions made on information between both of them.

In beginning, an authentication request is produced from the side of the contents receiver apparatus 200. The authentication request produced is then transmitted to the contents transmitter apparatus 100, being attached with the publication key unique to the apparatus, as was mentioned above, and also a certificate to the said publication key. When receiving the authentication request and transmitting a confirmation of receipt in response thereto, then the contents transmitter apparatus 100 produces an authentication request from the side of itself, and transmits it to the contents receiver apparatus 200, with attaching the publication key unique to the contents transmitter apparatus 100, which was issued in advance by the authentication organization, and also the certificate thereof, in the similar manner to the case of the contents receiver apparatus, and then, it starts the timer circuit 107, so as to measure a time-period T1 up to the time when receiving the receipt confirmation responding to the authentication request from the contents receiver apparatus 200. In a case where the measured value within the timer circuit 107 does not exceed a predetermined value (T); thus, T1<T, then it is authenticated that the contents receiver apparatus 200 is one, being within the region of the personal use (hereinafter, being called by "time authentication").

In this instance, when transmitting the authentication request from it to the contents transmitter apparatus 100, the contents receiver apparatus 200 stars up the timer 207, so as to measure the time-period T2 up to the time when it receives the receipt confirmation from the contents transmitter apparatus 100, thereby also enabling to execute the time authentication, as well. When the authentication is succeeded in this manner, on each other, then production is made on the authentication keys, being common with each other to be used commonly. For producing the authentication key, a conventional key exchange algorithm may be utilized or applied therein. After completion of common holding of the authentication keys, then the contents transmitter apparatus 100 generates an exchange key and a random number, and encrypting them with an aid of the respective authentication keys thereof, thereby transmitting them to the contents receiver apparatus 200.

Although the exchange key and the random number are transmitted, separately, from the contents transmitter apparatus 100 to the contents receiver apparatus 200, in FIG. 5 mentioned above, however those may be transmitted after being combined together. The contents receiver apparatus 200 decrypts the exchange key, which is transmitted from the contents transmitter apparatus 100, with using the authentication key, and also holds it together with the random number received, in the similar manner. Following thereafter, on each side of the contents transmitter apparatus 100 and the contents receiver apparatus 200, a common key is produced in accordance with a predetermined calculation algorithm, with using the exchange key and the random number. With an aid of the common key that is obtained in this manner, it is also possible to transmit the contents from the contents transmitter apparatus 100 while receiving the contents, which is decrypted at the contents receiver apparatus 200.

In a case when the authentication is succeeded between the contents transmitter apparatus 100 and the contents receiver apparatus 200, the contents receiver apparatus 200 transmits the authentication request to the contents transmitter apparatus 100, upon the chance of this, starting the transmission of the contents encrypted. When completing the transmission of the contents necessary, the contents transmitter apparatus 100 destroys or breaks out the authentication key, the exchange key, and also the common key, being necessary for encryption and/or decryption of the contents. And, in the contents receiver apparatus 200, the authentication key, the exchange key, and the common key are destroyed, in the similar manner; therefore, it may starts from issuing the authentication request newly, when it tries to receive of the contents, again. However, according to the present embodiment of the present invention, as was mentioned previously, the address information and the equipment information unique to the apparatus of the contents receiver apparatus 200 are registered into the equipment-information registration circuit 108 of the contents transmitter apparatus 100, when the time authentication is made upon the contents receiver apparatus 200. With doing so, since the contents transmitter apparatus 100 and the contents receiver apparatus 200 hold the common key mentioned above, without destroying it, with respect to the contents receiver apparatus 200 that is registered within the equipment-information registration circuit 108 of the contents transmitter apparatus 100, therefore it is not necessary to start the receipt of the contents from newly transmitting the authentication request, when transmitting the contents again.

Figure 6:
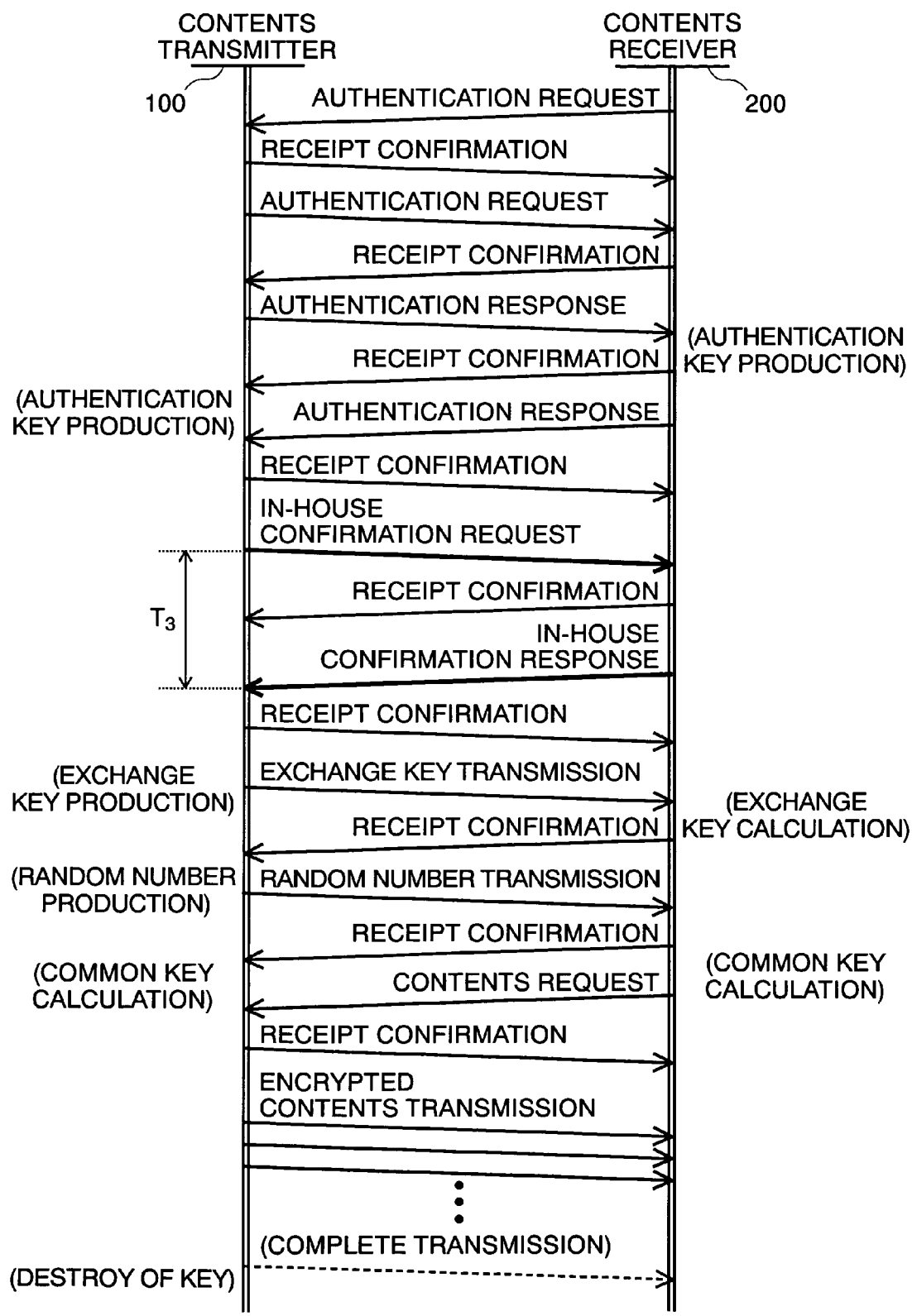
FIG. 6 is a view for showing processes for conducting a secure and correct time authentication between the contents transmitter apparatuses, according to the present invention.

FIG. 6 shows an example for enabling a further secure and correct measurement on the time-period, within the time authentication operation mentioned above. As is shown in this FIG. 6, when the authentication is succeeded between the contents transmitter apparatus 100 and the contents receiver apparatus 200, the contents transmitter apparatus 100, being common with each other, transmits the authentication request within a house to the contents receiver apparatus 200, and at the same time, it stars up the timer circuit 107. After transmitting the receipt confirmation responding to the in-house authentication request from the contents transmitter apparatus 100 mentioned above, the contents receiver apparatus 200 transmits a response for in-house confirmation. The contents transmitter apparatus 100 measures a time-period T3 up to the time when receiving the in-house confirmation response from the contents receiver apparatus 200, and in a case where it does not exceeds a predetermined value, the contents transmitter apparatus 100 authenticates that the said contents receiver apparatus is one of the apparatuses locating within the same house. In this manner, the authentication is executed between the equipments; i.e., the contents transmitter apparatus 100 and the contents receiver apparatus 200, and after conducting the authentication on each other, and then the time authentication is executed, thereby to enable the time authentication, being further secure and correct.

The protocol, which is to be used or applied into when transmitting the contents from the contents transmitter apparatus 100 to the contents receiver apparatus 200, should not be limited to a specific one; however, the followings can be applied therein, such as, RTP (Real-time Transport Protocol), HTTP (Hyper Text Transfer Protocol), FTP (File Transfer Protocol), etc. Upon transmission of the contents, it may be transmitted while receiving the contents, which is encrypted in accordance with the predetermined algorithm by using the common key, within a payload portion in each of the transmitting protocol. As an algorithm for encryption may be used the AES (Advanced Encryption Standard), which is already well-known technology, for example.

With those mentioned above, according to the second embodiment mentioned above of the present invention, the contents transmitter apparatus registers therein the address information and the equipment information unique to the apparatus of the contents receiver apparatus, upon which the time authentication was made once, and therefore it can transmit the contents encrypted when conducting the transmission of contents, again, but without conducting the time authentication no more upon the contents receiver apparatus; i.e., eliminating the time authentication, which must be conducted for every time when receiving the contents.

Embodiment 3

Hereinafter, explanation will be given on an embodiment 3, according to the present invention.

According to the present embodiment 3, it is also possible to view the contents supplied from the contents transmitter apparatus 100 through the Internet, such as, upon a portable or mobile telephone apparatus, for example.

FIG. 7 is a view for showing the structure, in particular, when viewing the contents, being transmitted through the Internet. A reference numeral 200c depicts the contents receiver apparatus for portable use, on which the contents transmitter apparatus made the time authentication once. For the portable contents receiver apparatus 200c being connected to the Internet, since inherently it cannot be authenticated, due to the fact that it brings up the condition that T1>T in the time authentication made between the contents transmitter apparatus 100, therefore it cannot receive the contents transmitted from the contents transmitter apparatus 100. However, according to the present invention, the contents transmitter apparatus 100 has made the time authentication upon the portable contents receiver apparatus 200c, once, thereby having registered the address information and the publication key unique to the apparatus, for the portable contents receiver apparatus 200c. With doing this, for the portable contents receiver apparatus 200c, it is possible to receive the contents transmitted from the contents transmitter apparatus 100, but without conducting the time authentication, even in the case where T1>T in the time authentication.

Also, since it is possible to receive the contents transmitted from the contents transmitter apparatus 100, but only for the apparatuses that are registered within the equipment-information registering means 108, therefore it is possible to achieve the copy protection, for protecting the contents from being illegally made a copy thereof, and further restricting the viewing and the copy production of the contents within the personal use thereof.

Further, when transmitting the TCP packet for transmitting the authentication request and the authentication response in response to the result thereof, it is also possible to apply such a restriction; i.e., setting a TTL (Time To Live) of the TCP packet for conducting the transmission of contents, or of the IP packet, to be transmitted with receiving UDP data-gram therein, down to a low value, such as "1", for example, so that authentication request will not pass through the router 400; thereby enabling to apply a restriction, so that the transmission of the contents does not exceed over the personal use thereof.

Example 4

Hereinafter, explanation will be given on an embodiment 4, according to the present invention.

According to the fourth embodiment, the transmission of contents is conducted between a contents transmitter apparatus 500 and a contents receiver apparatus, with using the wireless LAN.

FIG. 8 shows the contents transmitter apparatus via the wireless LAN, using the network communication processing circuits 503 and 603 for connecting with the LAN, comprising WEP (Wired Equipment Privacy) encryption processing circuits 509 and 603. The WEP is the conventional encryption method, which is normally applied to, be a standard for the purpose of security protection in the wireless LAN, and can achieve communication between the transmitter apparatus and the receiver apparatus, under the condition of protecting the security thereof.

Figure 9:
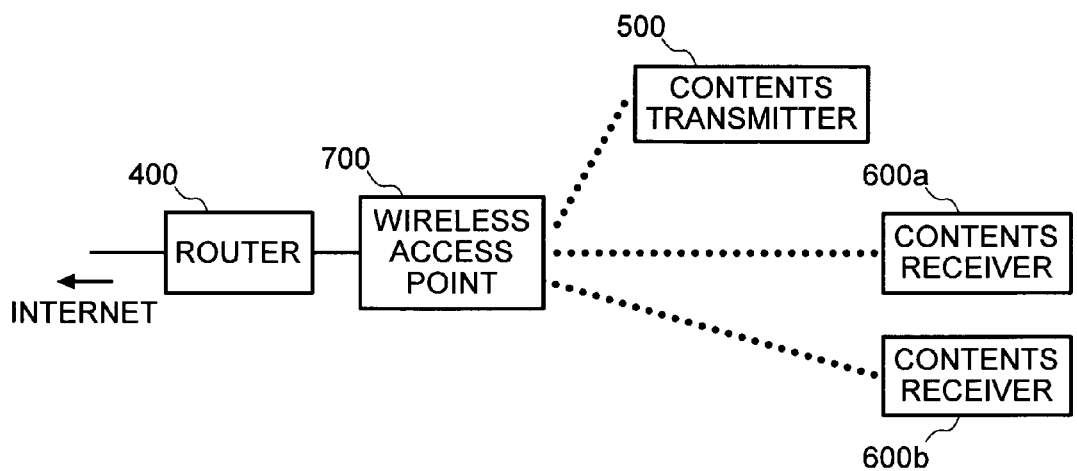
FIG. 9 is a block diagram for showing a wireless LAN system, which is made up with the contents transmitter apparatus and the contents receiver apparatus, according to the present invention.

FIG. 9 shows an example of the construction of the network provided within a house, with using the contents transmitter apparatus 500 and the contents receiver apparatus 600 therein. In this FIG. 9, the data transmitter apparatus 500 and two (2) sets of data receiver apparatuses 600a and 600b are connected with, by means of a wireless access point 700, via the wireless LAN. The wireless access point 700 is further connected to the router 400, and the router 400 is connected to the Internet, in the similar manner to the router 400, as shown in FIG. 2 mentioned above.

In a case when trying to conduct the mutual authentication between the contents transmitter apparatus 500 and the contents receiver apparatus 600 shown in FIG. 8, and also conduct the transmission of contents therebetween following thereafter, it is checked on whether the WEP process is processed or not by the authentication circuits 504 and 604, within the WEP encryption processing circuits 509 and 609. And, if the WEP process is not processed, then the necessary processes are conducted thereon; such as, neither to conduct the mutual authentication nor the transmission of contents following thereto, or alternately, to make a display for prompting a user to starts up the WEP process, etc., for example. In the manner as was mentioned above, the contents is necessarily in the condition that the WEP process is conducted thereon, always, when it is transmitted with using the wireless LAN. As a result of this, it is possible to avoid other data receiver apparatus from being connected with, through the wireless LAN, at a point where the users of the contents transmitter apparatus 500 and the contents receiver apparatus 600 are unconscious thereabout, thereby protecting the contents from being made a copy thereof illegally.

With other aspects than those mentioned above, it is also possible to achieve the protection of the copyright, by deterring an illegal production of a copy of the contents, in the manner being completely same to the contents transmission method, being executed in the contents transmitter apparatus and the contents receiver apparatus, explanation of which was already made by referring to the first embodiment through the third embodiment in the above, and therefore, at that instance, it is possible to prevent the contents from being transmitted, deviating from the region of the personal use thereof.

FIGS. 10(a) and 10(b) are views for showing examples, wherein a PDA (Personal Digital Assistance) is applied, for example, in the embodiment according to the present invention. FIG. 10(a) shows the connection when the authentication is made between the PDA (800) and the contents transmitter apparatus 100 and 500, and FIG. 10(b) shows that when viewing is made from an outside of the house on the contents of the contents transmitter apparatuses 100 and 500 locating within the house, by using the PDA (800), on which the above-mentioned authentication is made. A reference numeral 800 indicates the PDA, on which the contents distributed from the contents transmitter apparatuses 100 and 500 can be viewed, and 900 a display, enabling the viewing of the contents distributed from the contents transmitter apparatuses 100 and 500, within the house; such as, a plasma display and/or a liquid crystal display, for example.

For example, when connecting the PDA (800) purchased within the house, so as to conduct the time authentication between the contents transmitter apparatus 100 and also between the contents transmitter apparatus 500, respectively. If it is authenticated by the contents transmitter apparatus 100 and the contents transmitter apparatus 500, respectively, then both the contents transmitter apparatuses 100 and 500 register the address information of the PDA (800) and also the common key, being the unique information of the apparatus to be used when making the time authentication mentioned above, so as to manage them therein. Consequently, although conventionally it is not allowed for the PDA (800) locating outside the house to receive the contents distributed from the contents transmitter apparatuses 100 and 500 within the house, due to the time authentication. However, according to the present invention, since it has already received the time authentication, once, within the contents transmitter apparatuses 100 and 500, and also the equipment information is registered therein; therefore, it is possible to view the contents distributed from the contents transmitter apparatuses 100 and 500, on the PDA if locating in an outside of the house.

Embodiment 5

Hereinafter, explanation will be made on an embodiment 5, according to the present invention.

By referring to the embodiment 5 according to the present invention, explanation will be made on a method for making a check on the contents of the address information and the equipment information registered within the equipment-information registration circuit 108 of the contents transmitter apparatus 100, thereby always renewing the contents thereof to be suitable for the newest structure of the network.

FIG. 11 shows the structure of the equipment-information registration circuit 108, which is held within the contents transmitter apparatus 100.

With the equipment-information obtaining portion 1081, the equipment-information registration portion 1082, and the equipment-information management portion 1083, they are same to those mentioned above.

An equipment-information checking portion 1084 executes the time authentication, by using the timer circuit 107 mentioned above, for the purpose of checking the information registered within the equipment-information registration portion 1082, and it also gives an instruction to the equipment-information management portion 1083, to renew the contents of information registered therein, depending upon a result of the measurement or checking made thereon.

FIG. 12 is a view for showing an example of management data for the equipment-information checking portion 1084 to renew that information, being registered within said equipment-information registration portion 1082.

Thus, the equipment-information checking portion 1084 holds management information 1200; such as, a counter setup value 1201 and a present counter value 1202 for every the contents receiver apparatus 200, other than the address information and the equipment information unique to the apparatus, which are registered in relation to the contents receiver apparatus 200 mentioned above.

Next, explanation will be made on a method for the equipment-information checking portion 1084 to check the information registered within the equipment-information registration portion 1082, by referring to FIGS. 13 and 14 attached herewith.

Figure 13:
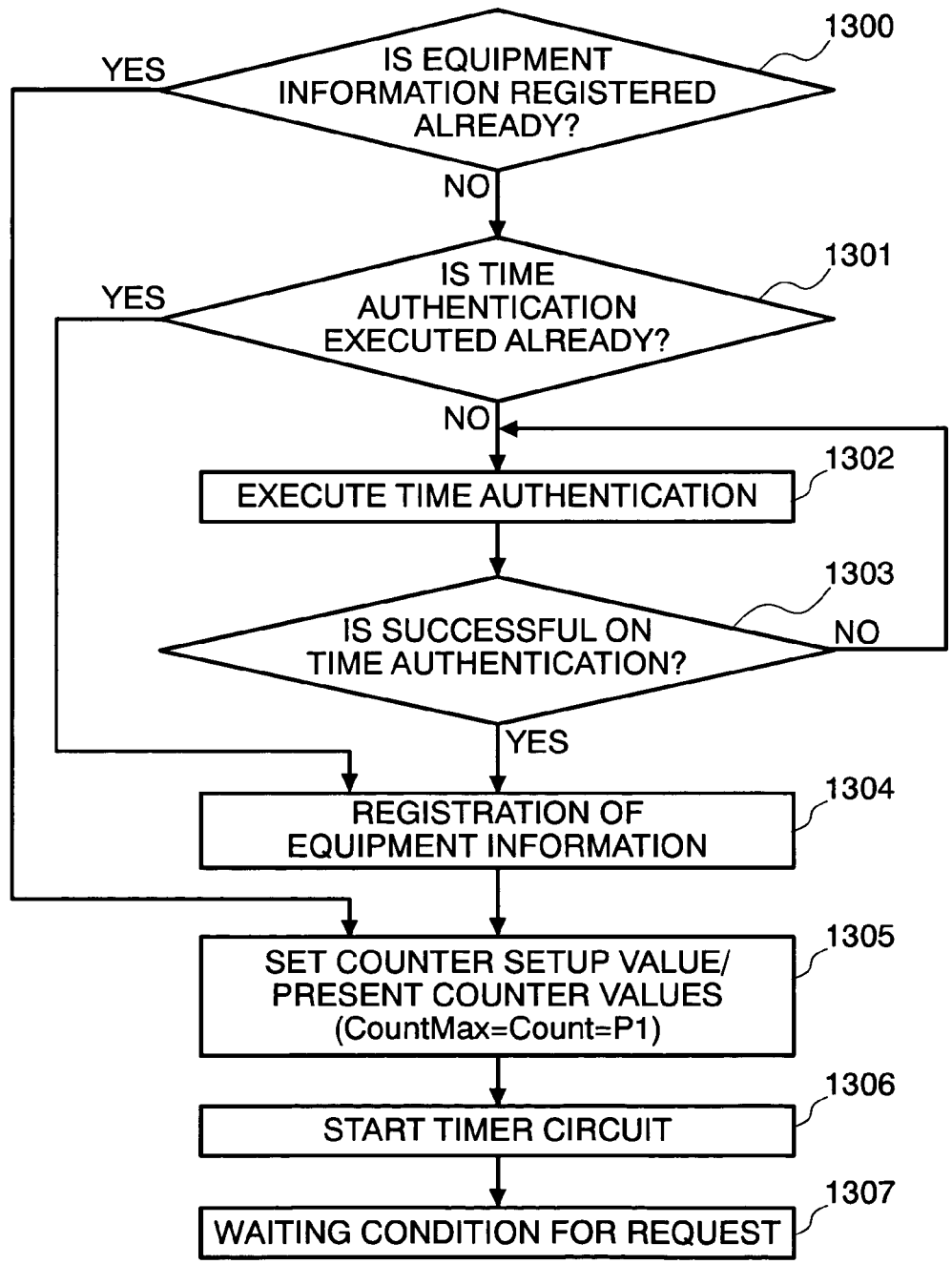
FIG. 13 shows an example of processes to be executed at the contents transmitter apparatus side, when an authentication is succeeded between the contents transmitter apparatus and the contents receiver apparatus, according to the present invention.

FIG. 13 shows an example of the processes, which are executed on the side of the contents transmitter apparatus 100 when the authentication is succeeded between the contents transmitter apparatus 100 and the contents receiver apparatus 200. When the authentication is successful between the contents receiver apparatus 200, the contents transmitter apparatus 100 makes a search, on whether the address information and the equipment information unique to the apparatus exist or not, being coincident with those of the contents receiver apparatus 200, among those registered within the equipment-information registration circuit 108 (step 1300). As a result thereof, if there is nothing being coincident with those, then it is determined on whether the time authentication mentioned above was conducted or not, during the time period when making the above-mentioned authentication (step 1301). If determining that the time authentication was not conducted, the time authentication is executed by using the timer circuit 107 (step 1302). Then, determining is made on a result of the time authentication (step 1303). And, if determining that it is succeeded, then the address information and the equipment information unique to the apparatus are registered within the said equipment-information registration circuit 108, about the contents receiver apparatus 200 (step 1304).

Thereafter, the equipment-information checking portion 1084 within the said equipment-information register circuit 108 produces the management information 1200 relating to that information registered, and it also set up a predetermined value (P1) into the counter setup value 1201 (CountMax) and also the present counter value 1202 (Count) (step 1305). Then, it starts up the said timer circuit 107, while setting up it to make an event notice every time when passing or elapsing a predetermined time-period (T4) (step 1306), and then it comes in the condition of waiting for, such as, the information and/or an authentication request from the apparatus on the network, for example (step 1307).

Herein, when being unsuccessful on the time authentication in the step 1303, then the time authentication is retried if necessary. And, further if it is also unsuccessful; then the process is ended, while bringing the contents receiver apparatus 200 into the condition that it cannot receive the contents.

Also, if it is decided, in the step 1300, that the said contents receiver apparatus 200 was already registered, then the process is shifted into the step 1305 mentioned above. Or, alternately, it may be shifted into the process of the step 1307 mentioned above, if Count<CountMax and the said timer circuit 107 is already under the operation thereof, by referring to the counter setup value 1201 (CountMax) and also the present count value 1202 (Count) within the management information.

Further, the predetermined value (P1) to be set up into the counter setup value 1201 (CountMax) in the step 1305 maybe a value, being common for all of the contents receiver apparatuses, or it may be one, being different for each of the contents receiver apparatuses.

Figure 14:
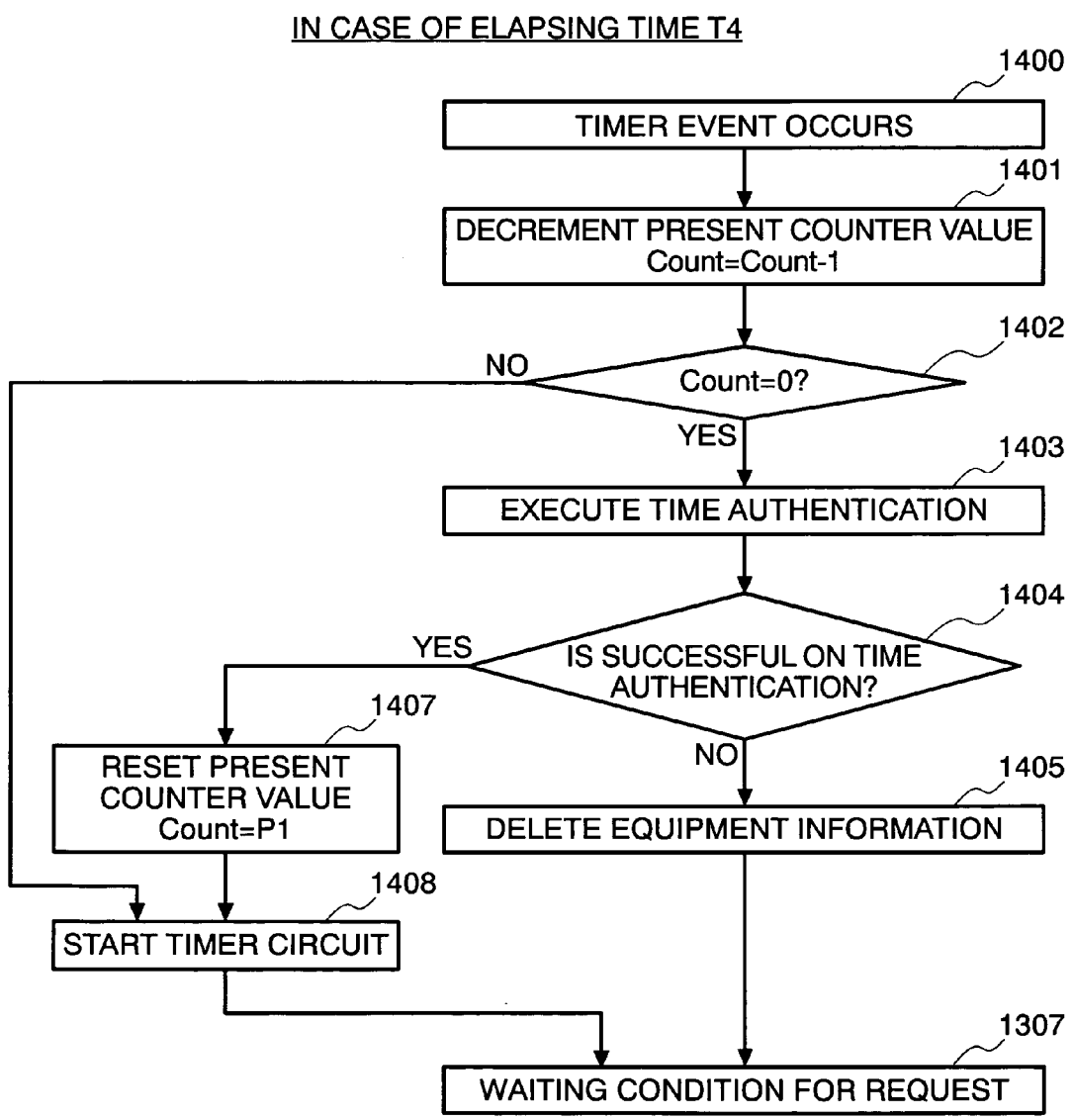
FIG. 14 shows an example of processes for the contents transmitter apparatus to execute a time authentication, periodically, according to the present invention.

Next, FIG. 14 shows an example of the processes to be executed on the side of the contents transmitter apparatus 100, when the event notice is generated from said timer circuit 107 due to the fact that the predetermined time-period (T4) passed or elapsed under the condition of the step 1307 mentioned above; i.e., waiting the notice.

First, when elapsing the time-period T4, the timer circuit 107 mentioned above generates a timer event, thereby making a notice to the contents transmitter apparatus 100 (step 1400). Upon receipt of this, the said equipment-information checking portion 1084 decrements the value of the present counter value 1202 (Count) (step 1401), and it determines on whether it satisfies Count=0 or not (step 1402).

As a result of this, in a case where Count=0, although there may be a method of destroying or deleting the information relating to the above-mentioned contents receiver apparatus 200 registered within the equipment-information registration circuit 108, and/or the authentication key, the exchange key and the common key if necessary, at this time point; however, according to the embodiment of the present invention, the time authentication is executed between the said contents receiver apparatus 200 with using said timer circuit 107, again (step 1403). And then, determination is made on a result of the time authentication (step 1404), and if it is succeeded, the value of the counter setup value 1201 is set into the present counter value 1202 within the management information (Count=CountMax) (step 1407), while starting up said timer circuit 107 (step 1408) in the similar manner to the above, thereby bringing the contents transmitter apparatus into the condition of waiting for a request (step 1307). On the other hand, when the time authentication is unsuccessful in the step 1404, then the time authentication is retried if necessary. And, further if it is also unsuccessful, then, said equipment-information checking portion 1084 makes a request to the said equipment-information managing portion 1083, so that it deletes the information relating to the contents receiver apparatus 200 mentioned above, and if necessary, it destroys the authentication key, the exchange key and the common key, too (step 1405). Finally, the contents transmitter apparatus is brought into the condition of waiting for a request (step 1307).

On the other hand, in a case where Count>0 in the step 1402, said the timer circuit 107 is started up, again, then the contents transmitter apparatus makes a setup, so that it gives an event notice every time when elapsing the predetermined time-period (T4) (step 1408), and it turns back into the condition of waiting for a request (step 1307).

Herein, in the mentioned above, though the said equipment-information checking portion 1084 makes the time authentication every time when elapsing the predetermined time-period (T4×CountMax), with using a constant time-period (T4) as a timing for decrementing the present counter setup value 1202, after registering the information relating to the contents receiver apparatus 200 into the equipment-information registration circuit 108; however, it is also possible, while measuring a time-period during when no contents is transmitted (or during a time-period of transmitting the contents), to conduct the time authentication when an accumulated value thereof reached to a constant value (T5).

Also, in the mentioned above, though using the time periods (T4/T5) for obtaining the timing for renewing the counter setup value, however it is also possible to use, for example, a predetermined number of packets of the contents transmitted to the contents receiver apparatus 200, or a predetermined number of renewals of the common key, which is conducted when transmitting the contents.

It is also possible to configure the counter setup value 1201 and the present counter setup value, at the time when detecting that there is none thereof, while making observation always on whether the said contents receiver apparatus 200 is locating on the network or not, after registering the information relating to the contents receiver apparatus 200 into the equipment-information registration circuit 108 mentioned above; thereby, renewing the present counter setup value 1202, while conducting the time measurement, periodically, through start-up of said timer circuit 107, and deleting the information relating to said receiver apparatus 200 from the said equipment-information registration circuit 108 if the time-period where no receiver apparatus can be found on the network reaches to the predetermine time-period, and if necessary, destroying the authentication key, the exchange key, and also the common key, too. Regarding the method of making the observing on whether the apparatus is located on the network or not, it should not be restricted to a specific one, but it is also possible to utilize a keep-alive function, which is provide by the TPC, etc.

Moreover, it is also possible to provide a plural number of counters (i.e., CountMax, Count1, CountMax2, Count2) within the said equipment-information checking portion 1084; thereby combining the timings in a plural number thereof, for conducting the time authentication. Thus, the following can be prospected, for example; i.e., the time authentication is conducted at the time when either one thereof reaches to the predetermined value (the CountMax or CountMax2), while decrementing the present counter setup value Count1 at every time-period (T4) and also the present counter setup value Count2 at every number (P1) of the transmission packets.

Herein, in the mentioned above, description was made about the contents transmitter apparatus 100, however those can be applied also into the contents transmitter apparatus 500, the contents receiver apparatuses 200 and 600, in the similar manner to that mentioned above.

From the above, it is possible to prevent the registration information relating to the apparatus, which is not yet connected with or is low on the frequency in use thereof, from being kept registered within the said equipment-information registration circuit 108, through periodical conduction of the time authentication, upon the information relating to the contents receiver apparatus 200, which is registered within the equipment-information registration circuit 108 by means of the equipment-information checking portions 1804 of the contents transmitter apparatus 100 and the contents receiver apparatus(es); thereby enabling the suitable management on the registration information in response to the network structure.

Embodiment 6

Explanation will be given on a sixth embodiment, according to the present invention.

Although the description was made, in the embodiment 5 mentioned above, about the method of conducting the time authentication, periodically, upon the contents receiver apparatus 200 registered within the equipment-information registration circuit 108, with an aid of the equipment-information checking portion 1804 of the contents transmitter apparatus 100; however, in the present embodiment 6, according to the present invention, explanation will be made also about a method, wherein the contents transmitter apparatus 100 conducts the time authentication, at an arbitrary timing when necessary.

Herein, as the time when it is necessary may be, there can be listed up a case; for example, when an electric power source is turned on, or when the apparatus is connected to the network, again, while the electric power source of the contents transmitter apparatus 100 and/or the network is/are cut-off or in the standby condition. Also, there can be listed up a case when conducting such the processes between the contents transmitter apparatus 100 and the contents receiver apparatus 200; for example, the reservation for viewing or the reservation for recording, etc., so that there may be caused a trouble if the transmission of contents is interrupted during the execution thereof.

Figure 15:
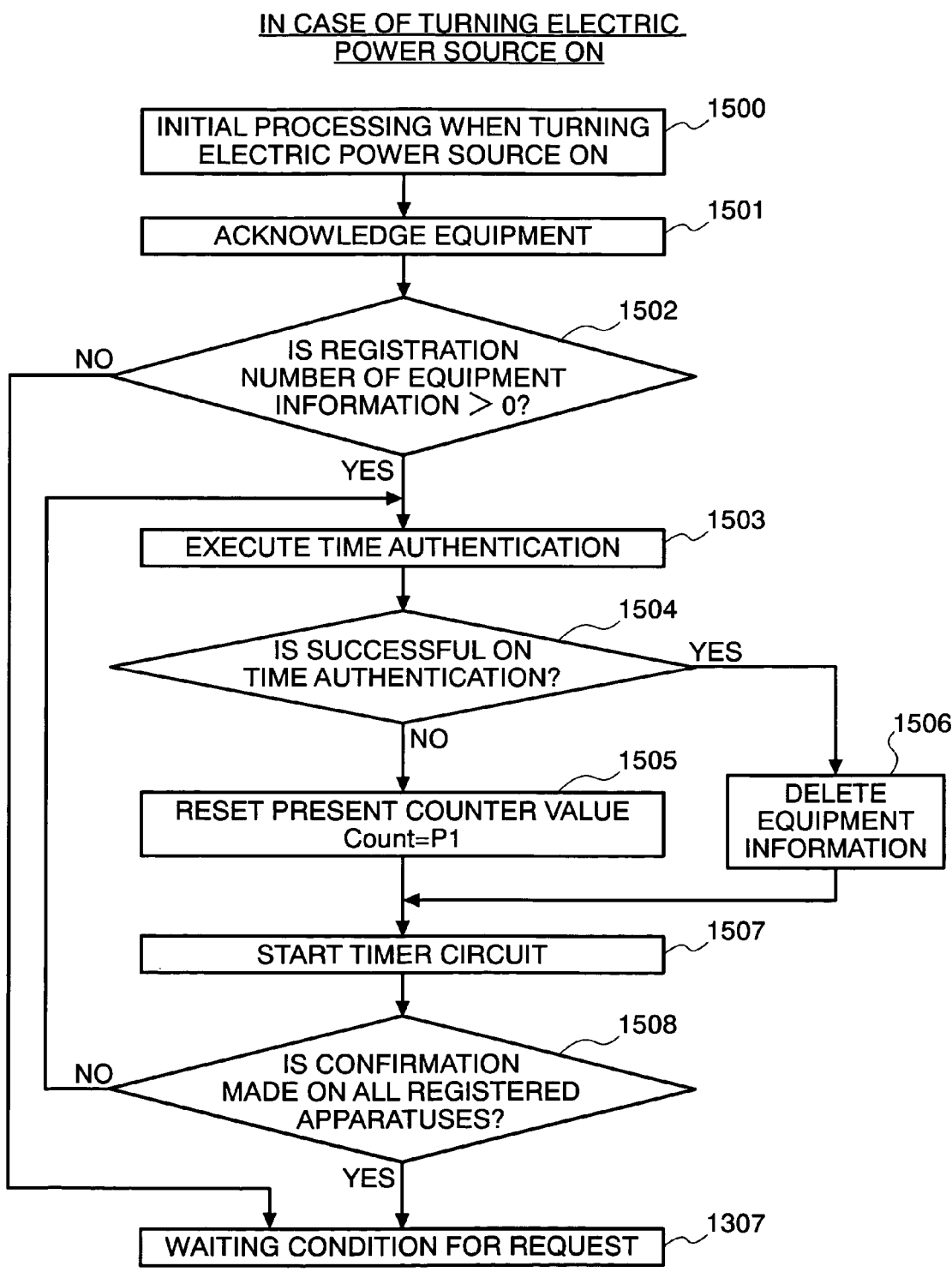
FIG. 15 shows an example of processes for the contents transmitter apparatus to execute the time authentication, in particular, when an electric power source thereof is turned on, according to the present invention.

FIG. 15 shows an example of a series of processing steps to be executed on the side of the contents transmitter apparatus, in particular, when the electric power source is turned on, after the electric power source of the contents transmitter apparatus 100 is turned cut-off or standby in the condition thereof.

Firstly, the contents transmitter apparatus 100 makes up a setup of the system and the initialization processes necessary when turning the electric power source on (step 1500), and it conducts the detection of the apparatus locating on the network (step 1501). With the detection method of the apparatuses, it should not be restricted to a specific one, and for an example, it is also possible to apply UP n P (Universal Plug and Play), Jini, etc.

Next, it is determined on whether the address information and the equipment information unique to the apparatus are registered or not, within the equipment-information registration circuit 108 (step 1502). If there are registered the equipment information about one (1) set or more of the contents receiver apparatuses 200, then the time authentication is executed with using the timer circuit 107 upon the contents receiver apparatus(es) 200 (step 1503). And, making determination on a result of the time authentication (step 1504), if it is succeeded, the value of the counter setup value 1201 is set into the present counter value 1202 (Count=CountMax) within the management information 1200, which is managed by the equipment-information checking portion 1804 (step 1505), and thereby starting up the said timer circuit 107 (step 1507), in the similar manner to that mentioned above.

On the other hand, when it is unsuccessful in the step 1504, the time authentication is retried if necessary, and further if it is also unsuccessful; then, deletion is made on the information relating to the said contents receiver apparatus 200, which is registered within the equipment-information registration circuit 108 (step 1506).

And, if the time authentication is completed upon all of the contents receiver apparatus(es) registered (step 1508), the contents transmitter apparatus is brought into the condition of waiting for a communication or a request from the apparatus(es) locating on the network (step 1308).

However, in the steps 1501 and 1502, by making comparison between the apparatus(es) locating on the network at the present and the address information and the equipment information unique to the apparatus, which are registered in the equipment-information registration circuit 108, it is also possible to delete the address information and the equipment information unique to the apparatus, at that time, in particular, relating to the apparatus(es) not locating on the network, in spite of existence of the address information and the equipment information unique to the apparatus thereof.

Also, said timer circuit 107 is stared up after succeeding the time authentication, in the steps 1505 and 1506, however it may be conducted after the step 1508, for example.

From the above-mentioned, it is possible to renew the registration information into the newest contents thereof, by paying the network structure into the consideration, through conducting the time authentication onto the contents receiver apparatus(es) 200 registered, in a case when the electric power source of the contents transmitter apparatus 100 is turned on or it is connected onto the network, again, while the electric power source of the contents transmitter apparatus 100 and the network are cut-off or in the standby condition.

Figure 16:
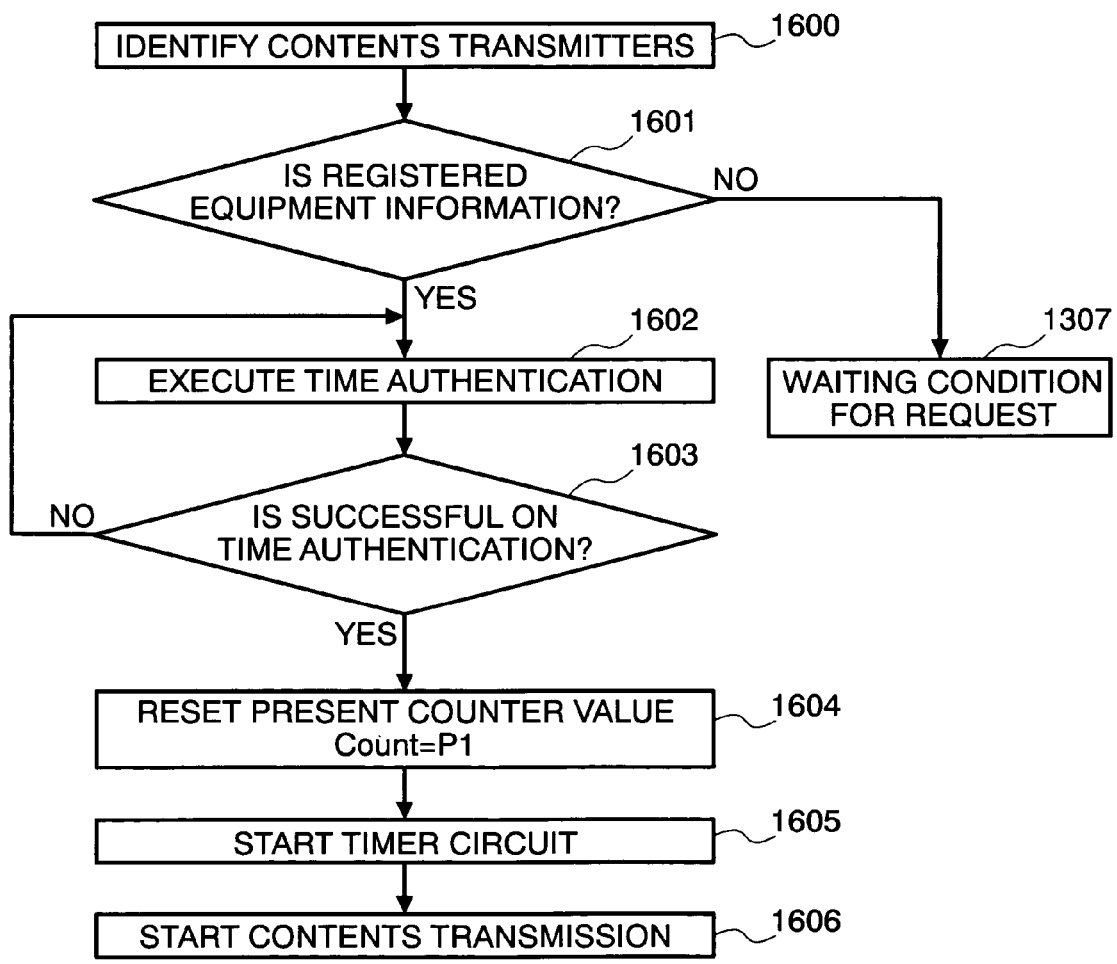
FIG. 16 shows an example of processes for the contents transmitter apparatus to execute the time authentication, in particular, when a reservation is made for viewing or recording of the contents, between the contents transmitter apparatus and the contents receiver apparatus, according to the present invention.

Next, FIG. 16 shows an example of steps to be executed on the side of the contents transmitter apparatus 100, in particular, when conducting the reservation for recording the contents transmitted by the contents transmitter apparatus 100 on the contents receiver apparatus 200.

First, the contents transmitter apparatus 100 specifies the contents receiver apparatus 200 aimed, being a destination of the contents transmitting, before starting the reservation for recording (step 1600), and it makes determination on whether the address information and the equipment information unique to the apparatus are registered or not, within the equipment-information registration circuit 108, about the said contents receiver apparatus 200 (step 1601). As a result, if it was already registered therein, then the time authentication is conducted on the contents receiver apparatus 200, with using the timer circuit 107 (step 1602), thereby making determination upon the result thereof (step 1603). If succeeding on the time authentication, then the value of the counter setup value 1201 is set into the present counter value 1202 (Count=CountMax) within the management information 1200, which is managed by the equipment-information checking portion 1804 (step 1604), thereby starting the said timer circuit 107 (step 1605), in the similar manner to that mentioned above. Thereafter, upon receipt of the contents request issued from the said contents receiver apparatus 200, the contents transmitter apparatus stars the transmission of contents (step 1606).

Herein, if the said contents receiver apparatus 200 is not registered, in the step 1601, the contents transmitter apparatus is turned into the condition of waiting for the authentication request issued from the said contents receiver apparatus 200 (step 1307). Herein, about the series of the steps mentioned above, but other than the reservation for viewing and/or the execution of the reservation, it is also possible to achieve it by executing the steps similar thereto, when the contents transmitted by the contents transmitter apparatus 100 changes, in particular, in the sort or kind thereof (such as, when a broadcasting program is switched over, or when a channel selected, or when the program to be stored is changed, etc., for example). It is also possible to execute the similar processes, in the case when detecting the existence of the contents receiver apparatus 200, again, which was cut-off from the electric power source and from the network, once, while observing the said contents receiver apparatus 200 always, or when detecting the recording condition, etc.

From the above, the contents transmitter apparatus 100 can conduct the time authentication, in advance, between the contents receiver apparatus 200, before the reservation for viewing and the reservation for recording and so on are executed, so as to turn the present counter value 1202 (Count) back to the counter setup value (CountMax); thereby enabling to prevent the time authentication from being operated during the operations of making the view reservation and the recording reservation, as far as possible, and also to avoid occurring the situation of deleting the information registered in relation to the said contents receiver apparatus 200, or of interrupting the transmission of contents.

Embodiment 7

Hereinafter, explanation will be made on an embodiment 7, according to the present invention.

With the present embodiment 7, explanation will be made on a method for renewing the counter value (Count), which is managed by the equipment-information checking portion 1804 of the contents transmitter apparatus 100, at an arbitrary timing, from a side of the contents receiver apparatus 200.

Figure 17:
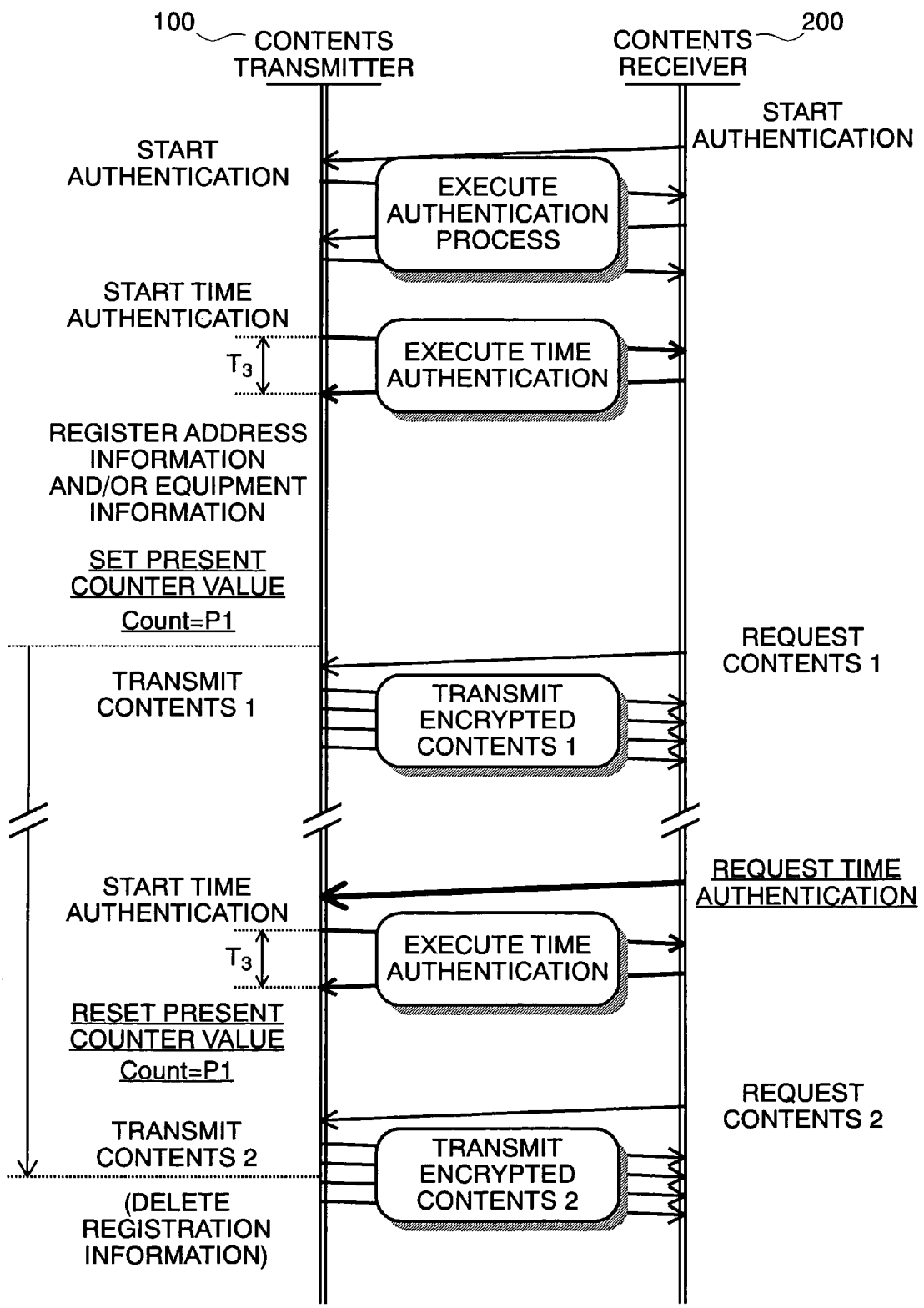
FIG. 17 shows an example of processes for the contents receiver apparatus to request the time authentication, according to the present invention.

FIG. 17 shows an example of steps for executing the authentication request, between the contents transmitter apparatus 100 and the contents receiver apparatus 200. In this figure, the left-hand side indicates that of the contents transmitter apparatus 100, while the right-hand side that of the contents receiver apparatus 200, and the time-period (T3) shown in FIG. 6 mentioned above is also used herein, regarding the predetermined value in the time authentication.

As was mentioned previously, when the authentication request is issued from the contents receiver apparatus 200 to the contents transmitter apparatus 100, a series of authentication processes is started. And, if succeeding on the execution of the time authentication, then the contents transmitter apparatus 100 registers the address information and the equipment information unique to the apparatus thereof into the equipment-information registration circuit 108, in relation to the said contents receiver apparatus 200. And, the equipment-information checking portion 1804 sets the counter setup value (CountMax) into the present counter value (Count), in the similar manner mentioned above, and it starts up the said timer circuit 107, thereafter being in the waiting condition to a request from the said contents receiver apparatus 200 and/or the other apparatus(es) locating on the network.

Herein, according to the present embodiment, it is assumed that the said contents transmitter apparatus 100 deletes the information relating to the said contents receiver apparatus 200, which is registered within the equipment-information registration circuit 108, when the present counter value reaches to zero (Count=0).

Under such the situation, when the said contents receiver apparatus 200 produces the transmission request upon contents 1, to transmit it to the said contents transmitter apparatus 100, then said contents transmitter apparatus 100 encrypts the said contents 1, so as to transmit it thereto. When further requesting to receiving contents 2 after completing the receipt of the said contents 1, the said contents receiver apparatus 200 produces an request for executing the time authentication and transmit it to said contents transmitter apparatus 100. Upon receipt of the said request, the said contents transmitter apparatus 100 executes the time authentication with using the said timer circuit 107, and if succeeding thereon, it sets the said present counter value (Count) into the counter setup value (CountMax), again. Thereafter, the said contents transmitter apparatus 200 produces the transmittion request on the contents 2, and thereby transmitting it towards the said contents transmitter apparatus 100.

Though the contents receiver apparatus 200 transmits an execution request upon the time authentication, during the time-period of receiving the contents 1 and the contents 2, in the above, however it may be conducted, periodically, or further at an arbitrary timing (such as, before making the reservation viewing/reservation recording, or when turning the electric power source on, for example).

There may be also a method for transmitting the execution request on the time authentication, such as; wherein the contents receiver apparatus 200 transmits it, while inquiring the present counter value (Count) to the contents transmitter apparatus 100, in particular, when the said counter value comes to be equal or less than a predestined threshold value.

From those mentioned above, for the contents receiver apparatus 200, by transmitting the execution request on the time authentication towards the contents transmitter apparatus 100, it is possible to make control, so as not to delete the information, which is registered relating to the said receiver apparatus, locating on the side of the contents transmitter apparatus 100.

In the above, the explanation was fully made about the present embodiments according to the present invention, wherein the contents transmitter apparatus executes the authentication upon the authentication request from the contents receiver apparatus and registers the address information and the unique information for equipment about the contents receiver apparatus; therefore it is possible to provide the contents transmitter apparatus and the receiver apparatus, enabling to execute the copy protection for preventing the contents from being made an illegal copy thereof, in particular, when transmitting the contents with using the wired or wireless LAN, and further it is also possible to limit the legal viewing and the copy production of the contents within the personal use thereof. However, it is needless to say that the effects similar to the above-mentioned can be also achieved, while the contents receiver apparatus authenticates the contents transmitter apparatus, and the address information and the unique information of equipment are registered about the contents transmitter apparatus. And also, in the explanation made in the above, an object to be transmitted through the network was explained to the contents, such as, video information, etc., and the contents transmitter apparatus and the receiver apparatus are those for transmitting and receiving such the contents; however, it is also same to other kinds of information than such the video information, etc., and with information processing apparatuses inputting/outputting those information, therefore it is needless to say that the present invention can be also applied therein.

Further, with executing the time authentication, periodically or appropriately between the contents transmitter apparatus and the contents receiver apparatus, it is possible to obtain a dynamical management upon the registration contents, such as, the address information and/or the unique information of equipment mentioned above, etc.

According to the present invention, it is possible to provide the contents transmitter apparatus and the receiver apparatus, enabling the copy protection to be executed for preventing the contents from the illegal copying thereof, during when transmitting the contents, even with using the wired or wireless LAN provided within a house, and further restricting the legal viewing and copy production of the contents can be made within the region of the personal use thereof.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A contents transmitter apparatus configured for transmitting copy protected contents to a content receiver apparatus comprising:
    an authentication circuit configured for executing authentication of the contents receiver apparatus using equipment information received from the contents receiver apparatus, and transmitting key information to the contents receiver apparatus, so as to decrypt encrypted contents to be transmitted to the contents receiver apparatus;
    a timer circuit configured for measuring a first time after predetermined information is transmitted to the contents receiver apparatus until a response to the predetermined information is received from the contents receiver apparatus to determine whether the contents receiver apparatus is located within a region of personal use, and a second time after the equipment information of the contents receiver apparatus is registered by a registration circuit;
    the registration circuit being configured for registering the equipment information when the authentication becomes successful and the measured first time does not exceed a first predetermined time, and for deleting the equipment information of the contents receiver apparatus when the measured second time exceeds a second predetermined time; and
    a content transmitter circuit configured for encrypting the contents and sending out encrypted contents to the content receiver apparatus with a copy control information of the contents, wherein:
    the authentication circuit transmits the key information to the contents receiver apparatus when the authentication becomes successful and the equipment information is registered in the registration circuit; and
    the authentication circuit transmits the predetermined information and/or an authentication request that indicates that number of apparatuses through which the predetermined information and/or the authentication request pass so that the authentication circuit limits the number of apparatuses through which the predetermined information and/or the authentication request pass.

2. The contents transmitter apparatus, as is described in claim 1, wherein the authentication circuit executes the first time measurement with respect to the contents receiver apparatus for the equipment information which is registered in the registration circuit, and when the measured first time exceeds the first predetermined time, deletes the stored equipment information relating to the contents receiver apparatus from the storage.

3. The contents transmitter apparatus, as is described in claim 1, wherein the authentication circuit executes the first time measurement every predetermined time-period or every predetermined number of transmitted contents packets, with respect to the contents receiver apparatus for the equipment information, which is registered in the registration circuit, and resets the second time measurement when the measured first time does not exceed the first predetermined time.

4. The contents transmitter apparatus, as is described in claim 1, wherein the authentication circuit executes the first time measurement with respect to the contents receiver apparatus whose equipment information is registered in the registration circuit, in response to at least one of turning on the contents transmitter apparatus, activating the contents transmitter apparatus from a stand-by mode, and connecting the contents transmitter apparatus to a network, and resets the second time measurement when the measured first time does not exceed the first predetermined time.

5. The contents transmitter apparatus, as is described in claim 1, wherein the authentication circuit executes the first time measurement in response to making a reservation of recording or viewing of the contents or changing the contents, with respect to the contents receiver for the equipment information apparatus which is registered in the registration circuit, and resets the second time measurement when the measured first time does not exceed the first predetermined time.

6. The contents transmitter apparatus, as is described in claim 1, wherein
    the key information is not transmitted to the contents receiver apparatus when the first time measurement is executed by using the timer circuit and the measured first time exceeds the first predetermined time.

7. A contents transmitting method in a contents transmitter apparatus configured for transmitting copy protected contents to a contents receiver apparatus, the method comprising:
    executing authentication of the contents receiver apparatus using equipment information received from the contents receiver apparatus;
    measuring a first time after predetermined information is transmitted to the contents receiver apparatus until a response to the predetermined information is received from the contents receiver apparatus to determine whether the contents receiver apparatus is located within a region of personal use;
    registering the equipment information when the authentication becomes successful and the measured first time does not exceed a first predetermined time;
    measuring a second time after the equipment information of the contents receiver apparatus is registered;
    deleting the equipment information of the contents receiver apparatus when the measured second time exceeds a second predetermined time;
    encrypting the contents and sending out encrypted contents to the content receiver apparatus with a copy control information of the contents; and
    transmitting key information to the contents receiver apparatus when the authentication becomes successful and the equipment information is registered in the registration circuit, so as to decrypt encrypted contents to be transmitted to the contents receiver apparatus, wherein the predetermined information and/or an authentication request indicates the number of apparatuses through which the predetermined information and/or an authentication request pass so that the contents transmitter apparatus limits the number of apparatus through which the predetermined information and/or the authentication request pass.

8. The contents transmitter apparatus, as is described in claim 1, wherein
when execution of the first time measurement by the timer circuit is requested from the contents receiver apparatus for the equipment information which is registered in the registration circuit,
the first time measurement is executed by the timer circuit for the contents receiver apparatus, and
the second time measurement by the timer circuit is conducted, again, from beginning thereof, when the measured first time does not exceed the first predetermined time.

9. The contents transmitting method, as is described in claim 7, wherein
when execution of the first time measurement is requested from the contents receiver apparatus for the equipment information which is registered in the registration circuit,
the first time measurement is executed by a timer circuit for the contents receiver apparatus, and
the second time measurement by the timer circuit is conducted, again, from beginning thereof, when measured first time does not exceed the first predetermined time.

10. The contents transmitting method, as is described in claim 7, wherein
the first time measurement is executed by using a timer circuit with respect to the contents receiver apparatus for the equipment information, which is registered in the registration circuit, and when the measured first time exceeds the first predetermined time, the registered equipment information relating to the contents receiver apparatus is deleted from the registration circuit.

* * * * *